United States Patent
Chu

(10) Patent No.: US 10,907,715 B2
(45) Date of Patent: Feb. 2, 2021

(54) DIFFERENTIAL SYSTEM WITH DIFFERENTIAL RATE GOVERNED BY VARIABLE SPEED MOTOR AND ASSOCIATED METHOD OF OPERATION

(71) Applicant: Shaun Chu, Canton, MA (US)

(72) Inventor: Shaun Chu, Canton, MA (US)

( * ) Notice: Subject to any disclaimer, the term of this patent is extended or adjusted under 35 U.S.C. 154(b) by 0 days.

(21) Appl. No.: 16/428,426

(22) Filed: May 31, 2019

(65) Prior Publication Data

US 2019/0383379 A1 Dec. 19, 2019

Related U.S. Application Data

(60) Continuation of application No. 15/623,178, filed on Jun. 14, 2017, now Pat. No. 10,352,424, which is a
(Continued)

(51) Int. Cl.
*B60W 30/045* (2012.01)
*F16H 48/36* (2012.01)
(Continued)

(52) U.S. Cl.
CPC ............. *F16H 48/36* (2013.01); *B60W 10/16* (2013.01); *B60W 30/02* (2013.01);
(Continued)

(58) Field of Classification Search
CPC .............. F16H 2048/364; F16H 48/36; F16H 2048/343; F16H 2048/346; Y10T 477/606;
(Continued)

(56) References Cited

U.S. PATENT DOCUMENTS 1,382,289 A 6/1921 Janicki
2,746,319 A 5/1956 Greenbergh
(Continued)

FOREIGN PATENT DOCUMENTS

| EP | 1621800 A2 | 2/2006 | |
|---|---|---|---|
| GB | 2428755 A * | 2/2007 | ...... B60W 30/18172 |
| WO | 2017/198357 A1 | 11/2017 | |

OTHER PUBLICATIONS

International Search Report and Written Opinion for Application No. PCT/US2017/023816, dated Aug. 17, 2017. 18 pages.
(Continued)

*Primary Examiner* — Roger L Pang
(74) *Attorney, Agent, or Firm* — McCarter & English, LLP

(57) ABSTRACT

Disclosed herein are systems, gearing assemblies, and methods for controlling a differential rotation rate between shafts of a vehicle using a variable speed motor. An embodiment includes a gearing assembly including a differential configured to engage a first axle shaft, a second axle shaft, and a drive shaft of a vehicle. The gearing assembly further includes a plurality of adjustment gears configured to engage the differential, configured to be driven by a variable speed motor of the vehicle, and configured to controllably alter a rotation of the first axle shaft relative to the second axle shaft based on rotation produced by the variable speed motor. The plurality of adjustment gears includes a subassembly of planetary gears including a planetary gear carrier, a first set of planetary gears coupled to the planetary gear carrier, and a second set of planetary gears coupled to the planetary gear carrier.

22 Claims, 18 Drawing Sheets

Related U.S. Application Data division of application No. 15/239,733, filed on Aug. 17, 2016, now Pat. No. 9,709,148.

(60) Provisional application No. 62/325,261, filed on Apr. 20, 2016.

(51) Int. Cl.
  B60W 30/02 (2012.01)
  B60W 10/16 (2012.01)
  *F16H 48/08* (2006.01)
  *F16H 48/34* (2012.01)
  *F16H 48/20* (2012.01)
  *F16H 37/08* (2006.01)
  *B60W 30/18* (2012.01)

(52) U.S. Cl.
  CPC ..... *B60W 30/045* (2013.01); *B60W 30/18145* (2013.01); *B60W 30/18172* (2013.01); *B60W 2510/0638* (2013.01); *B60W 2510/20* (2013.01); *B60W 2710/12* (2013.01); *B60W 2720/266* (2013.01); *B60W 2720/406* (2013.01); *F16H 37/082* (2013.01); *F16H 48/08* (2013.01); *F16H 48/20* (2013.01); *F16H 2048/343* (2013.01); *F16H 2048/346* (2013.01); *F16H 2048/364* (2013.01); *Y10T 477/606* (2015.01)

(58) Field of Classification Search
  CPC ....... B60W 2720/406; B60W 2510/20; B60W 30/18172; B60W 2720/266; B60W 2510/0638; B60W 10/16; B60W 30/18145; B60W 30/045; B60W 30/02
  USPC ..................................................... 701/88, 90
  See application file for complete search history.

(56) References Cited

U.S. PATENT DOCUMENTS

| | | | |
|---|---|---|---|
| 3,010,342 A | 11/1961 | Kelley | |
| 3,450,218 A | 6/1969 | Looker | |
| 4,784,017 A | 11/1988 | Johnshoy | |
| 4,819,512 A * | 4/1989 | Azuma | B60K 17/20 180/248 |
| 5,368,120 A * | 11/1994 | Sakai | B60T 11/103 180/197 |
| 5,387,161 A | 2/1995 | Shibahata | |
| 5,409,425 A | 4/1995 | Shibahata | |
| 6,959,799 B2 | 11/2005 | Fusegi et al. | |
| 7,056,252 B2 | 6/2006 | Gumpoltsberger et al. | |
| 7,115,057 B2 | 10/2006 | House | |
| 7,273,436 B2 | 9/2007 | Hiroyuki et al. | |
| 7,344,469 B2 | 3/2008 | Sharma et al. | |
| 7,357,748 B2 | 4/2008 | Kelley, Jr. | |
| 7,500,933 B2 | 3/2009 | Baasch et al. | |
| 7,588,511 B2 | 9/2009 | Tangl et al. | |
| 7,604,560 B2 | 10/2009 | Shiotsu et al. | |
| 8,672,790 B2 | 3/2014 | Severinsson et al. | |
| 9,109,687 B1 * | 8/2015 | Chu | F16H 48/34 |
| 2005/0266951 A1 | 12/2005 | Han | |
| 2005/0272547 A1 | 12/2005 | House | |
| 2006/0025267 A1 | 2/2006 | Gradu | |
| 2006/0025273 A1 | 2/2006 | Gradu | |
| 2006/0079370 A1 | 4/2006 | Kushino | |
| 2006/0172847 A1 | 8/2006 | Gradu | |
| 2009/0197727 A1 | 8/2009 | Janson | |
| 2009/0270214 A1 | 10/2009 | Nowak et al. | |
| 2010/0234158 A1 | 9/2010 | Kato et al. | |
| 2010/0234161 A1 | 9/2010 | Kato et al. | |
| 2012/0035820 A1 * | 2/2012 | Falkenstein | B60K 6/52 701/69 |
| 2012/0245776 A1 * | 9/2012 | Okada | B60K 7/00 701/22 |
| 2013/0200210 A1 | 8/2013 | Oswald et al. | |
| 2013/0203543 A1 | 8/2013 | Sten | |
| 2014/0274527 A1 | 9/2014 | Sten et al. | |
| 2014/0315675 A1 | 10/2014 | Watanabe | |
| 2015/0166035 A1 | 6/2015 | Gieryluk | |
| 2015/0336453 A1 | 11/2015 | Pinschmidt | |
| 2016/0356370 A1 * | 12/2016 | Richards | B60W 10/184 |
| 2017/0227105 A1 | 8/2017 | Pinschmidt et al. | |
| 2018/0154882 A1 | 6/2018 | Sasaki et al. | |
| 2019/0128396 A1 * | 5/2019 | Chu | B60K 17/046 |

OTHER PUBLICATIONS

International Preliminary Report on Patentability for Application No. PCT/US2017/023816, dated Oct. 4, 2018. 14 pages.

* cited by examiner

DIFFERENTIAL SYSTEM WITH DIFFERENTIAL RATE GOVERNED BY VARIABLE SPEED MOTOR AND ASSOCIATED METHOD OF OPERATION

RELATED APPLICATIONS

This application is a Continuation Application of U.S. application Ser. No. 15/623,178, filed Jun. 14, 2017, which is a Divisional of U.S. application Ser. No. 15/239,733, filed Aug. 17, 2016 and issued as U.S. Pat. No. 9,709,148, which claims benefit of and priority to U.S. Provisional Application No. 62/325,261, filed Apr. 20, 2016, the contents of all of which are incorporated herein in their entireties.

BACKGROUND

Most automobiles have engines and transmissions. The engine and transmission is used to turn a driveshaft. The driveshaft is connected to a differential. The differential transfers the rotational energy of the driveshaft to the axles and wheels of the automobile.

Generally, when an automobile is driving in a straight line, the wheels on the left side of the vehicle and the wheels on the right side of the vehicle rotate at the same speed. However, when the automobile makes a turn, the wheels on the outside of the turn must travel farther than the wheels on the inside of the turn. Consequently, the wheels on the outside of the turn must rotate at a slightly faster rate than the inside wheels during the turn. The use of differentials enables opposing axles on opposite sides of the vehicle to rotate at different speeds. As such, the wheels of the vehicle can each rotate at the proper speed to accommodate a turn.

Many conventional differentials are designed based on operation when the wheels of the automobile are encountering good road conditions. In real life, this is not always the case. Roads are often covered in snow, ice, dirt, gravel, mud and the like that can make a wheel slip or skid during a turn. In such situations, differentials may misinterpret the conditions and allow too much power to be applied to the slipping wheel. This can adversely affect the safety of the vehicle.

In attempts to limit such traction problems, some vehicle manufacturers use limited-slip differentials. A limited-slip differential is a type of automotive differential gear arrangement that allows for some difference in angular velocity of the output shafts, but imposes mechanical boundaries on the disparity. In an automobile, such limited-slip differentials are sometimes used in place of a standard differential, where they convey certain dynamic advantages, at the expense of greater complexity. See, for example, U.S. Pat. No. 7,357,748 to Kelly, entitled Limited Slip Differential.

Prior art electronic limited slip differentials have certain innate problems. Being limited slip differentials, such prior art differentials do allow for some slip of the axles and wheels, albeit that the slip is limited in range. Under certain circumstances, even limited slip can detract from the safety of a vehicle. Torque transfer is another common problem associated with limited slip differentials. Limited slip differentials endeavor to redirect torque to the axle with the most traction. However, some torque is always lost to the axle of the slipping wheel. Furthermore, differentials are traditionally mechanical devices. The addition of electronics to differentials has increased their complexity and corresponding cost of manufacture. The use of electronic controls within the differential makes the differential expensive to build and difficult to repair.

A need therefore exists for an improved differential system that precisely controls a differential rotational rate between different axle shafts while allowing for no significant slip. A need also exists for a differential that has the precision of electronic controls, yet is simple and inexpensive to manufacture.

SUMMARY

Embodiments described herein include systems, gearing assemblies, and methods for controlling differential rotation between different axle shafts of a vehicle.

In one embodiment, a gearing assembly is provided. The gearing assembly includes a differential configured to engage a first axle shaft, a second axle shaft, and a drive shaft of a vehicle. The gearing assembly further includes a plurality of adjustment gears configured to engage the differential, configured to be driven by a variable speed motor of the vehicle, and configured to controllably alter a rotation of the first axle shaft relative to the second axle shaft based on rotation produced by the variable speed motor. The plurality of adjustment gears includes a subassembly of planetary gears including a planetary gear carrier, a first set of planetary gears coupled to the planetary gear carrier, and a second set of planetary gears coupled to the planetary gear carrier.

In an example embodiment, the second set of planetary gears is configured to couple with the first axle shaft of the vehicle.

In an example embodiment, the plurality of adjustment gears further includes a sun gear coupled with or attached to the differential, where the sun gear is configured to engage the first set of planetary gears. The plurality of adjustment gears interact with the differential through the sun gear. In an example embodiment, the differential includes a gear carrier and the sun gear is attached to the gear carrier. In an embodiment, the differential includes a miter gear carrier and the sun gear is attached to the miter gear carrier.

In an example embodiment, the plurality of adjustment gears further includes an internal gear configured to engage the second set of planetary gears, where the internal gear is stationary with respect to the variable speed motor.

In an example embodiment, the orbital speed of the first set of planetary gears is proportional to the rotational speed of the first axle shaft. In a further embodiment, the plurality of adjustment gears is configured to enable the orbital speed of the first set of planetary gears to be selectively adjusted using the variable speed motor.

In an example embodiment, the plurality of adjustment gears further includes an annular gear or a ring gear that transfers rotational motion from the variable speed motor to the first set of planetary gears. In a further embodiment, the annular gear or the ring gear has interior gear teeth that engage the first set of planetary gears. In yet a further embodiment, the annular gear or the ring gear also has exterior teeth that are engaged by a control shaft driven by the variable motor.

In yet a further embodiment, the plurality of adjustment gears is configured such that zero rotation of the annular gear or the ring gear corresponds to no difference in rotational velocity between the first axle shaft and the second axle shaft.

In yet another embodiment, the plurality of adjustment gears is configured such that a rate of rotation of the annular gear or the ring gear is proportional to a desired difference in rotational velocity between the first axle shaft and the second axle shaft.

In an example embodiment, the plurality of adjustment gears is configured such that a rate of rotation output by the variable speed motor is proportional to a difference in rotational velocity between the first axle shaft and the second axle shaft.

In another example embodiment, the gearing assembly does not rely on friction when altering or maintaining a rotation rate of the first axle shaft relative to the second axle shaft.

In another embodiment, a method includes determining a desired differential in rotational velocity between a first axle shaft and a second axle shaft of a vehicle. The determining is based, at least in part, on a current steering angle of the vehicle and on a current rotational velocity of a first drive shaft of the vehicle using a microprocessor of the vehicle, where the first drive shaft powers a differential to which the first axle shaft and the second axle shaft are connected. The method also includes sending a signal to a variable speed motor of the vehicle based on the desired differential in rotational velocity to control relative rotation of the first axle shaft and the second axle shaft to match the desired differential in rotational velocity to within an allowable range.

In a further embodiment, determining the desired differential in rotational velocity includes receiving information regarding a sensed current turning angle of the vehicle and receiving information regarding a sensed current rotational velocity of the first drive shaft of the vehicle.

In an example embodiment, the variable speed motor controls relative rotation of the first axle shaft and the second axle shaft by rotating a control shaft at a rotational velocity that is proportional to the desired differential in rotational velocity.

In an example embodiment, the method further includes changing the allowable range based, at least in part, on a sensor input while the vehicle is in motion or in response to a user input.

In an example embodiment, the method further includes determining a second desired differential in rotational velocity between a third axle shaft and a fourth axle shaft of the vehicle. The determining is based, at least in part, on the current steering angle of the vehicle and on the current rotational velocity of a second drive shaft of the vehicle, where the second drive shaft powers a second differential to which the third axle shaft and the fourth axle shaft are connected. The method also includes sending a signal to a second variable speed motor of the vehicle based on the desired second differential in rotational velocity to control relative rotation of the third axle shaft and the fourth axle shaft to match the desired second differential in rotational velocity to within a second allowable range, wherein the second allowable range is the same as or different than the allowable range.

In a further example embodiment, the first and second axle shafts are shafts of a rear axle of the vehicle, and the third and fourth axle shafts are shafts of a front axle of the vehicle. The method further includes determining a third desired differential in rotational velocity between the first drive shaft and the second drive shaft of the vehicle. The determining is based, at least in part, on the current turning angle of the vehicle and on the current rotational velocity output by the transmission or drive motor of the vehicle. The method also includes sending a signal to a third variable speed motor of the vehicle based on the desired third differential in rotational velocity to control relative rotation of the first drives haft and the second drive shaft to match the desired third differential in rotational velocity to within a third allowable range.

In an example embodiment, determining the desired differential in rotational velocity between the first axle shaft and the second axle shaft of the vehicle is also based on information regarding a width of the vehicle and a wheelbase of the vehicle.

In an example embodiment, determining the desired differential in rotational velocity between the first axle shaft and the second axle shaft of the vehicle includes adding a factor related to a differential baseline during straight line travel based on a vehicle asymmetry. In a further embodiment, the factor related to a differential baseline during straight line travel is determined based on a sensed resistance to the desired differential rate during a period of time when the vehicle is in motion.

In another example embodiment, a method includes determining if a magnitude of a current steering angle of a vehicle is larger than a minimum steering angle value and determining if a magnitude of a current rotational velocity of a first drive shaft of the vehicle is nonzero using a microprocessor of the vehicle. If the magnitude of the current turning angle is larger than the minimum turning angle value and the magnitude of the current rotational velocity of the drive shaft is greater than the minimum drive rotational velocity value, then the method includes determining a desired differential in rotational velocity between a first axle shaft and a second axle shaft of the vehicle. The determining is based, at least in part, on the current steering angle of the vehicle and on the current rotational velocity of the first drive shaft of the vehicle using the microprocessor of the vehicle, where the first drive shaft powers a differential to which the first axle shaft and the second axle shaft are connected. The method further includes sending a signal to a variable speed motor of the vehicle based on the determined desired differential in rotational velocity to controllably alter a rotation of the first axle shaft relative to a rotation of the second axle shaft.

In an example embodiment, if the magnitude of the current turning angle is larger than the minimum turning angle value and the magnitude of the current rotational velocity of the drive shaft is nonzero, then the method includes determining a second desired differential in rotational velocity between a third axle shaft and a fourth axle shaft of the vehicle. The determining is based, at least in part, on the current steering angle of the vehicle and on the current rotational velocity of a second drive shaft of the vehicle, where the second drive shaft powers a second differential to which the third axle shaft and the fourth axle shaft are connected. The method also includes sending a signal to a second variable speed motor of the vehicle based on the determined second desired differential in rotational velocity to controllably alter the rotation of the third axle shaft relative to the fourth axle shaft.

In a further embodiment, the first and second axle shafts are shafts of a rear axle of the vehicle, and the third and fourth axle shafts are shafts of a front axle of the vehicle. The method includes determining a third desired differential in rotational velocity between first drive shaft and the second drive shaft of the vehicle based. The determining is based, at least in part, on the current steering angle of the vehicle and on the current rotational velocity output by the transmission or drive motor of the vehicle. The method also includes sending a signal to third variable speed motor of the vehicle based on the determined third desired differential in rotational velocity to controllably alter the rotation of the first drive shaft relative to a rotation of the second drive shaft.

In a further embodiment, the method also includes receiving information regarding a sensed current turning angle of the vehicle and receiving information regarding a sensed current rotational velocity of the drive shaft of the vehicle. In a further embodiment, the minimum steering angle value falls in a range of 0.01 degrees to 5 degrees. In a further embodiment, the method also includes changing the minimum steering angle based, at least in part, on a sensor input while the vehicle is in motion or in response to a user input.

Some embodiments include a system for controlling a differential in rotation between a first axle and a second axle. The system includes a gearing assembly as described herein and a variable speed motor configured to drive a control shaft of the gearing assembly. In some embodiment, the system also includes a processor or microprocessor configured to determine a desired differential rate and to control the variable speed motor.

BRIEF DESCRIPTION OF THE DRAWINGS

The drawings are intended to illustrate example embodiments taught herein and are not intended to show relative sizes and dimensions, or to limit the scope of examples or embodiments. In the drawings, the same numbers are used throughout the drawings to reference like features and components of like function.

DETAILED DESCRIPTION

Example embodiments include systems, gearing assemblies, and methods for control of a differential in rotation between axle shafts. Some embodiments do not rely on friction when altering the rotation rate of a first axle shaft relative to a second axle shaft. Such embodiments may be advantageous because they do not permit slip of axles and wheels, thereby increasing the safety of a vehicle. Embodiments that do not rely on friction may also be advantageous as eliminating components that rely on friction eliminates components that are likely to wear out due to friction, which may reduce long term costs. Embodiments that do not rely on friction or that allow only a slight deviation from the desired differential in rotational speed between the axle shafts may benefit from the reduction or elimination of torque-steer, which occurs due to unequal torque being supplied to drive wheels. Additional aspects and benefits of various embodiments are described below.

First Example Embodiment

Figure 1:
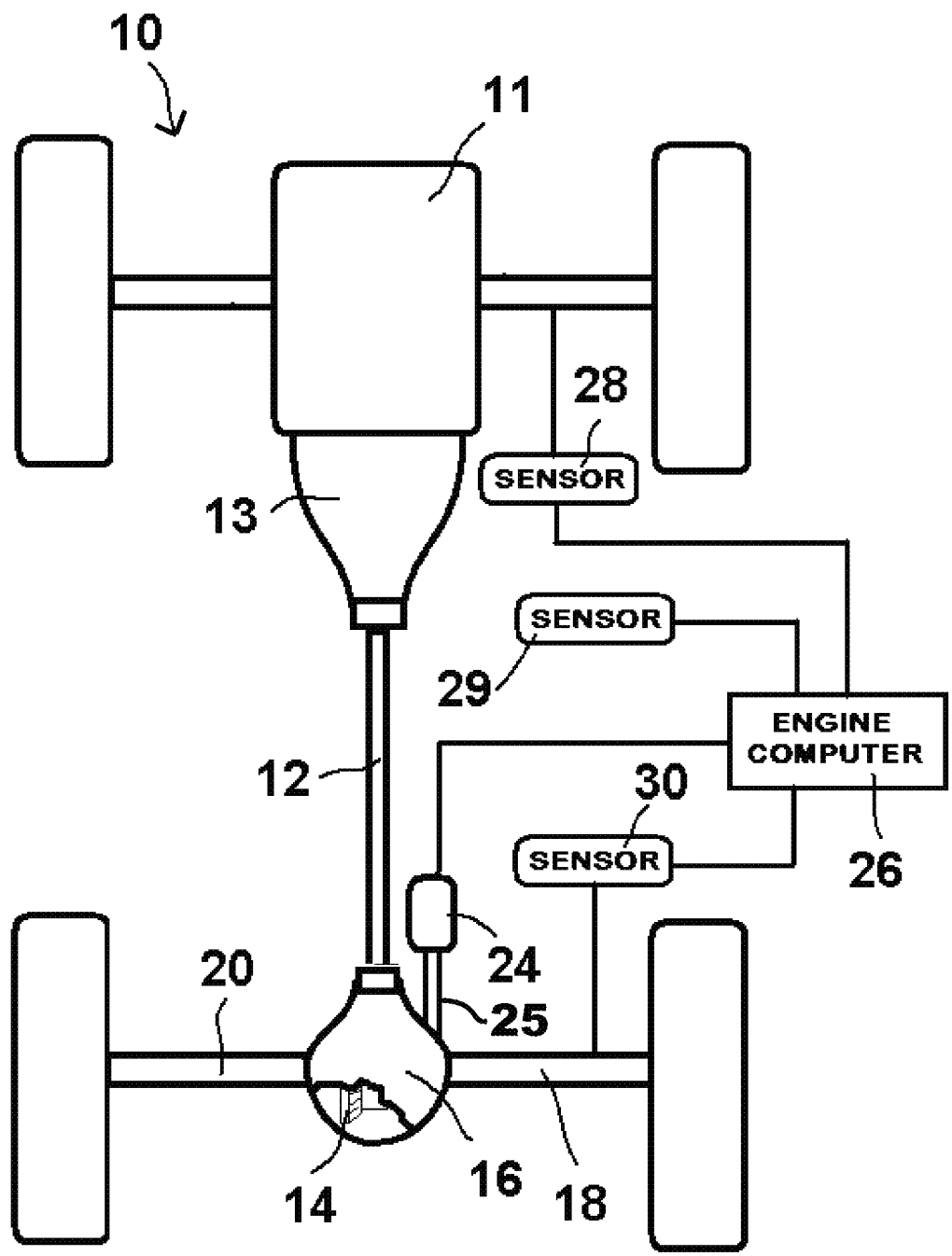
FIG. 1 is a schematic showing some electrical and mechanical components of a vehicle including a gearing assembly in accordance with some embodiments.

FIG. 1 is a schematic overview of a vehicle incorporating a system 10 for controlling relative rotation of a first and second axle shaft, in accordance with some embodiments. Referring to FIG. 1, an schematic overview of a vehicle is shown that contains the present invention system 10. The vehicle has an engine 11 and a transmission 13 that turns a driveshaft 12. The driveshaft 12 is connected to a gearing assembly 14 held within a differential casing 16. The differential casing 16 protects the gearing assembly 14 and holds oil about the gearing assembly 14.

The gearing assembly 14 transfers the rotational energy of the driveshaft 12 to two rear axle shafts 18, 20. The axle shafts 18, 20 rotate the rear wheels 21, 22 of the vehicle. As will later be explained, the rotational speed transferred to each of the rear axle shafts 18, 20 depends upon various conditions.

The gearing assembly 14 is also acted upon by an variable speed motor 24. Variable speed motors that can be employed include, but are not limited to electric motors (e.g., servo or stepper motors), and hydrostatic motors.

In some embodiments, the variable speed motor 24 is controlled by the engine computer 26 of the vehicle. In some embodiments, the control signals sent to the variable speed motor 24 by the engine computer 26 depend upon inputs received from three primary sensor sets. Those sensor sets include a steering angle sensor 28, a driveshaft rotational velocity sensor 29, and axle rotational velocity sensors 30. The variable speed motor 24 drives a control shaft 25 that communicates with the gearing assembly 14.

Figure 2:
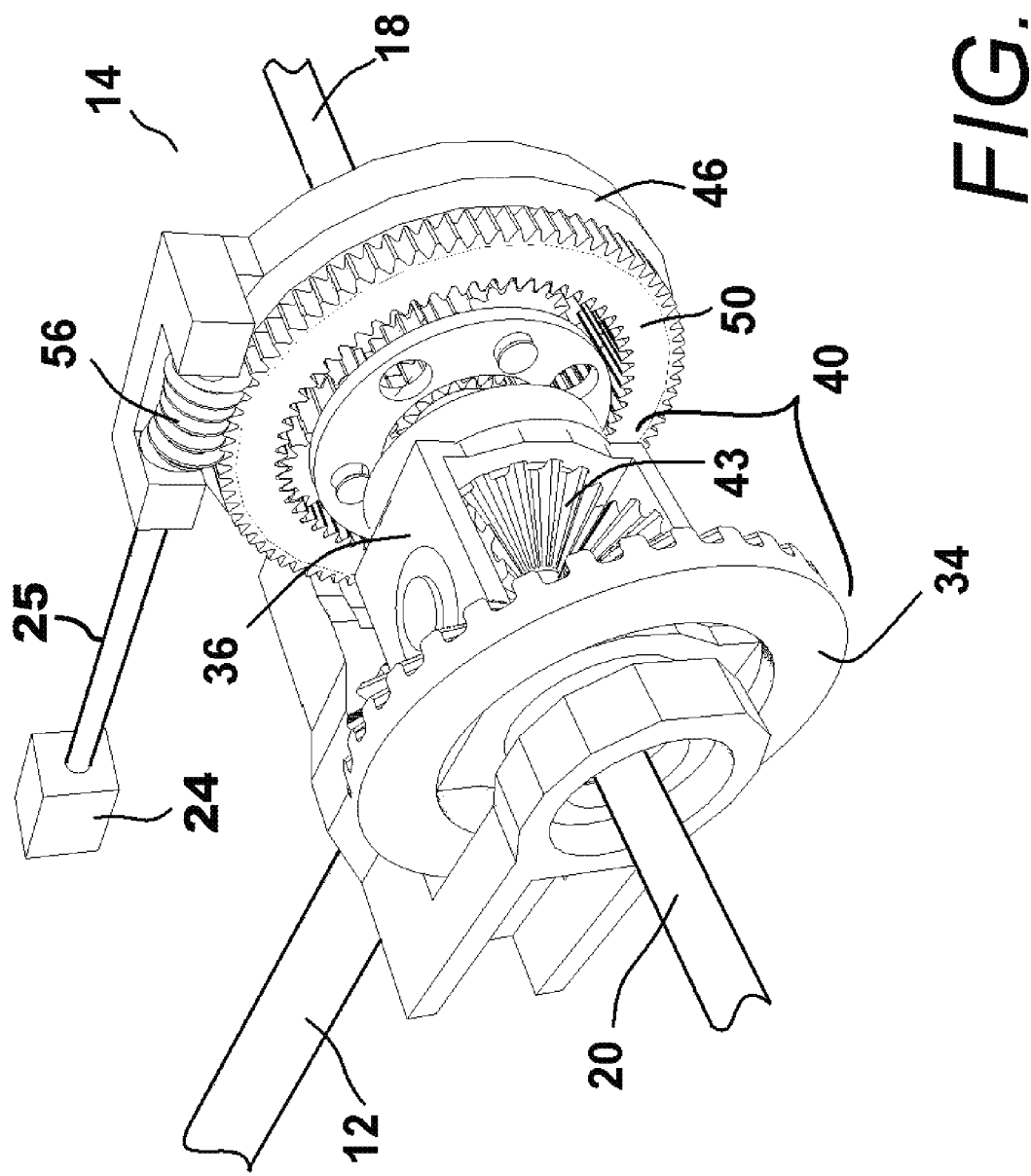
FIG. 2 is a perspective view showing a first example embodiment of a gearing assembly.
Figure 3:
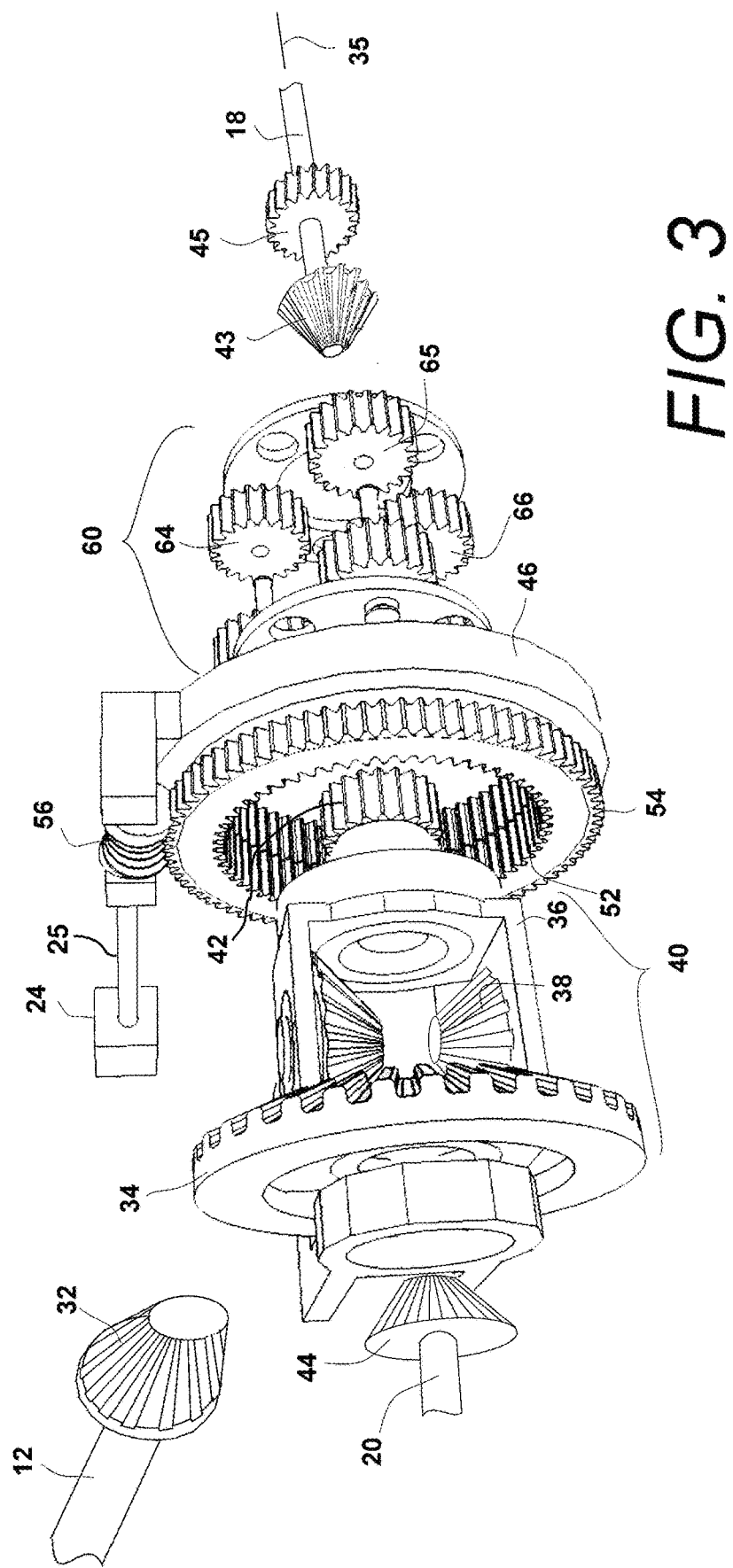
FIG. 3 is an exploded perspective view of the gearing assembly shown in FIG. 2.

Referring to FIG. 2 in conjunction with FIG. 3, the details of the gearing assembly 14 contained within the differential casing 16 are shown. Within the gearing assembly 14, the driveshaft 12 terminates with a traditional beveled pinion gear 32. The pinion gear 32 turns a large beveled ring gear 34 that is set about the primary axis of rotation 35 of the two rear axles 18, 20. The beveled ring gear 34 is attached to a miter gear carrier 36. The miter gear carrier 36 turns with the beveled ring gear 34. The miter gear carrier 36 carries either one or two miter gears 38. In the shown embodiment, two miter gears 38 are shown. The miter gears 38 are oriented at a perpendicular to the primary axis of rotation 35 in the traditional manner.

The beveled pinion gear 32, beveled ring gear 34, miter gear carrier 36 and miter gears are herein referred to collectively as the differential 40, which is configured to engage the first axle shaft 18, the second axle shaft 20, and a drive shaft 12 of the vehicle. One or ordinary skill in the art will appreciate that the components of the differential 40, may vary. For example, the gear carrier 36 may have a different shape or configuration, the beveled ring gear 34 may be a spiral beveled ring gear. There may be more or fewer than two miter gears (e.g., there may be four miter gears).

The gearing assembly 14 also includes a plurality of adjustment gears configured to engage the differential 40, configured to be drive by the variable speed motor 24 and configured to controllable alter a rotation of the first axle shaft 18 relative to the second axle shaft 20 based on rotation produced by the variable speed motor 24. The plurality of adjustment gears includes a subassembly of planetary gears 60 including a planetary gear carrier, a first set of planetary gears 61, 62, 63 coupled to the planetary gear carrier, and a second set of planetary gears 64, 65, 66 coupled to the planetary gear carrier. The second set of planetary gears 64, 65, 66 is configured to couple with the first axle shaft 18 of the vehicle. In some embodiments the second set of planetary gears 64, 65, 66 is configured to engage and turn a gear 45 attached to the first axle shaft 18 of the vehicle. In some embodiments, the second set of planetary gears are configured to engage and turn a spur gear 45 or a helical gear attached or coupled to the first axle shaft 18.

In some embodiments, the plurality of adjustment gears also includes a sun gear 42 coupled with or attached to the differential 40 where the sun gear 40 is configured to engage the first set of planetary gears 64, 65, 66 and the plurality of adjustment gears interact with the differential 40 through the sun gear 20. In some embodiments, the sun gear 42 is attached to the gear carrier 36 of the differential. The sun gear 42 is oriented on the primary axis of rotation 35. It will therefore be understood that the sun gear 42 rotates with the beveled ring gear 34 and the gear carrier 36 of the differential 40.

Both axles 18, 20 terminate with beveled drive gears 43, 44. The second axle shaft 20 extends through the beveled ring gear 34, wherein its beveled drive gear 44 intermeshes with the beveled miter gears 38 in the miter gear carrier 36 of the differential 40. Conversely, the first axle shaft 18 extends through the center of the sun gear 42, wherein its beveled drive gear 43 intermeshes with the beveled miter gears 38 in the miter gear carrier 36 of the differential 40.

In some embodiments, the plurality of adjustment gears also includes an internal gear (e.g., stationary internal spur gear 46), that is configured to engage the second set of planetary gears 64, 65, 66. The internal gear is stationary with respect to the variable speed motor. For example, stationary internal spur gear 46 is connected to the differential casing 16 and therefore does not move. In some embodiments, the internal gear is a helical internal gear.

In some embodiments, the plurality of adjustment gears also includes an annular gear 50 or a ring gear that transfers rotations motion from the control shaft 25 driven by the variable speed motor 24 to the first set of planetary gears 61, 62, 63. The annular gear 50 has interior gear teeth 52 that engage the first set of planetary gears 61, 62, 63. The annular gear also has exterior gear teeth 54. In the shown embodiment, the interior of the annular gear 50 is the same size and has the same gearing as does the interior of the internal spur gear 48. However, these dimensions and gearing types can be altered depending upon numerous factors, such as wheel size and vehicle type to optimize performance. The annular gear 50 is positioned around the sun gear 42 of the miter gear carrier 36.

A gear (e.g., worm gear 56) associated with the control shaft 25 engages the exterior gear teeth 54 of the annular gear 50. In embodiments with a worm gear, the worm gear 56 is stationary, being anchored to the differential casing. In some embodiments, the gear associated with the control shaft has a different configuration (e.g., a spur gear or a helical gear). In this first example embodiment, the axis of rotation of the control shaft 25 is oriented roughly parallel to the drive shaft and perpendicular to the axis of rotation 35 of the axle shafts; however, in other embodiments, the axis of rotation of the control shaft 25 may be parallel to the axis of rotation of rotation 35 of the axle shafts or may have a different orientation.

The gear associated with the control shaft 56 (e.g., the worm gear 56) selectively rotated by the variable speed motor 24. As the worm gear 56 turns, it intermeshes with the exterior gear teeth 54 of the annular gear 50 and causes the annular gear 50 to turn. Because the worm gear 56 can be rotated by the variable speed motor 24 at different speeds, it will be understood that the annular gear 50 can also be selectively rotated at different speeds. In some embodiments, the worm gear 56 prevents the first axle shaft 18 and the second axle shaft 20 from rotating at different rates when the control shaft 25 is not turning.

Figure 4:
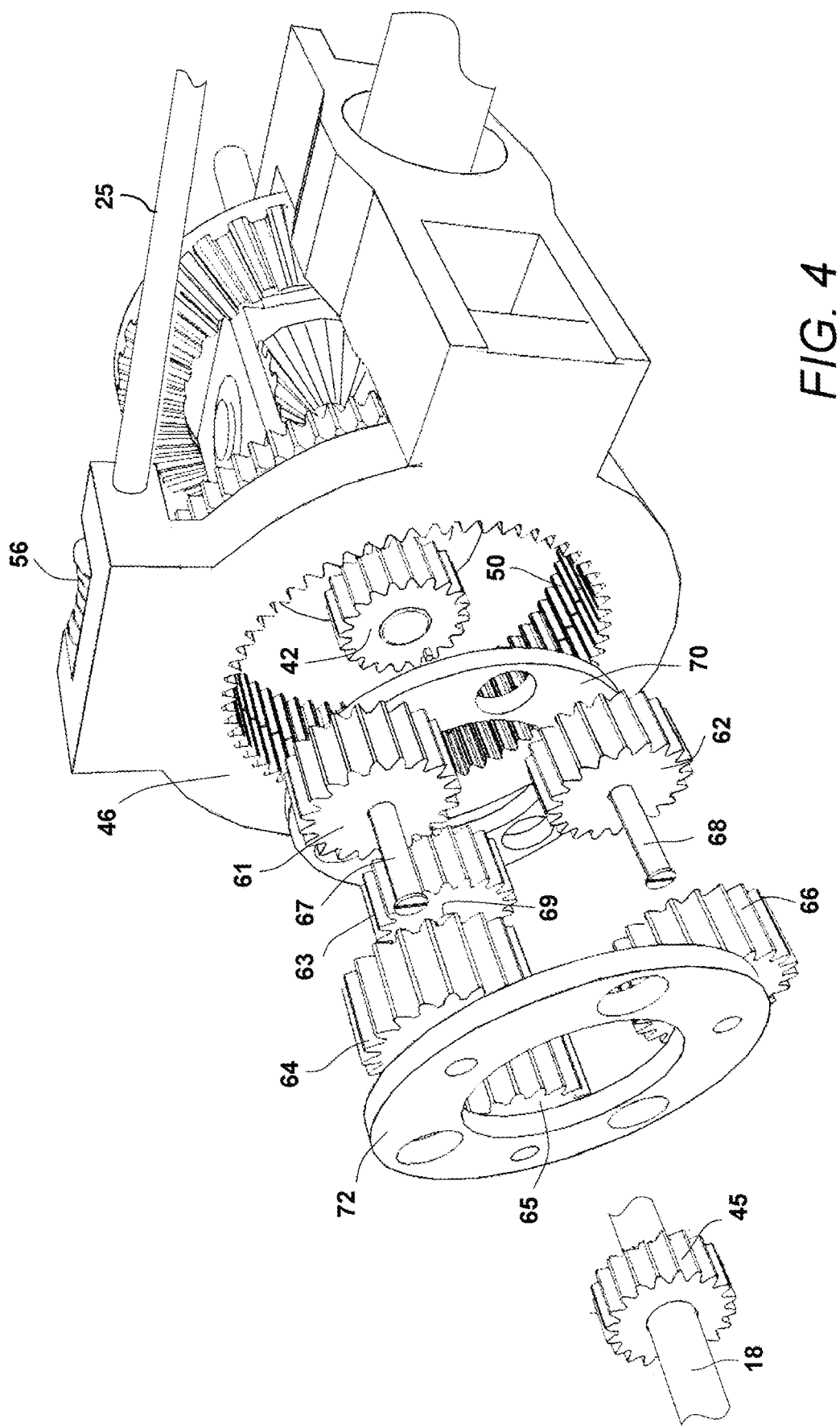
FIG. 4 is an exploded reverse perspective view of the gearing assembly shown in FIG. 2.

FIG. 4 in conjunction with FIG. 3, show the subassembly 60 of planetary gears. The subassembly 60 includes six planetary gears 61, 62, 63, 64, 65, 66, set into a framework of three pins 67, 68, 69 between two endplates 70, 72. The planetary gears 61, 62, 63, 64, 65, 66 are arranged in two sets of three. The first set of planetary gears 61, 62, 63 orbits the sun gear 42 and joins the sun gear 42 to the interior gear teeth 52 of the annular gear 50. The second set of planetary gears 64, 65, 66 orbit the spur gear 45 on the first axle shaft 18 and joins the spur gear 45 to the internal spur gear 46. The use of six planetary gears 61, 62, 63, 64, 65, 66 is merely exemplary and it will be understood that any number of planetary gears can be used provided the described transfer of mechanical energy between components is achieved. In this first example embodiment, the planetary gear carrier includes the endplates 70, 72 and the pins 67, 68, 69. One of ordinary skill in the art will appreciate that the planetary gear carrier may have a variety of different configurations.

When the miter gear carrier 36 within the differential 40 turns, the sun gear 42 also turns. The sun gear 42 turns the first set of planetary gears 61, 62, 63. The orbital movement of the first set of planetary gears 61, 62, 63 is transferred to the second set of planetary gears 64, 65, 66 by the pins 67, 68, 69. The second set of planetary gears 64, 65, 66 turns the spur gear 45 on the first axle shaft 18. The spur gear 45 turns the first axle shaft 18 and any vehicle wheel that is attached to that first axle shaft 18. Consequently, by the various interconnections, the orbital speed of the first set of planetary gears 61, 62, 63 is proportional to the rotational speed of the first axle shaft 18.

The orbital speed of the first set of planetary gears 61, 62, 63 can be selectively adjusted by the gear 56 (e.g., worm gear) connected to by the control shaft 25 variable speed motor 24. As the motor turns the control shaft 25, the gear connected to the control shaft (e.g., worm gear 56) causes the annular gear 50 to rotate. Depending upon its direction of rotation, the rotation of the annular gear 50 will either increase the orbital speed of the first set of planetary gears 61, 62, 63 or decrease the speed of the same. Since the orbital speed of the first set of planetary gears 61, 62, 63 is proportional to the rotational speed of the first axle shaft 18, it will be understood that the turning of the worm gear 56 either increases or decreases the rotational speed of the first axle shaft 18. Accordingly, by operating the variable speed motor 24, the plurality of adjustment gears enable the rotational speed of the first axle shaft 18 to be selectively adjusted (e.g., increased or decreased) relative to the rotational speed of the second axle 20. The plurality of adjustment gears are configured such that a rate of rotation of the annular gear or ring gear 50 is proportional to a desired difference in rotational velocity between the first axle shaft 18 and the second axle shaft 20. Similarly, the rate of rotation output by the variable speed motor is proportional to the resulting difference in rotational velocity between the first axle shaft 18 and the second axle shaft 20. Zero rotation of the annular gear 50 or the ring gear corresponds to no difference in rotational velocity between the first axle shaft 18 and the second axle shaft 20.

The two axle shafts 18 and 20 are coupled together and rotate together equally unless a difference is allowed via the rotation of the worm gear 56. Should the variable speed motor 24 fail, the worm gear 56 would not turn. The differential 40 still operates and the two axle shafts 18, 20 remain free to rotate together at a common rate of rotation. In some embodiments, the gearing assembly 14 does not rely on friction when altering or maintaining a rotation rate of the first axle shaft 18 relative to the second axle shaft 20.

Figure 5:
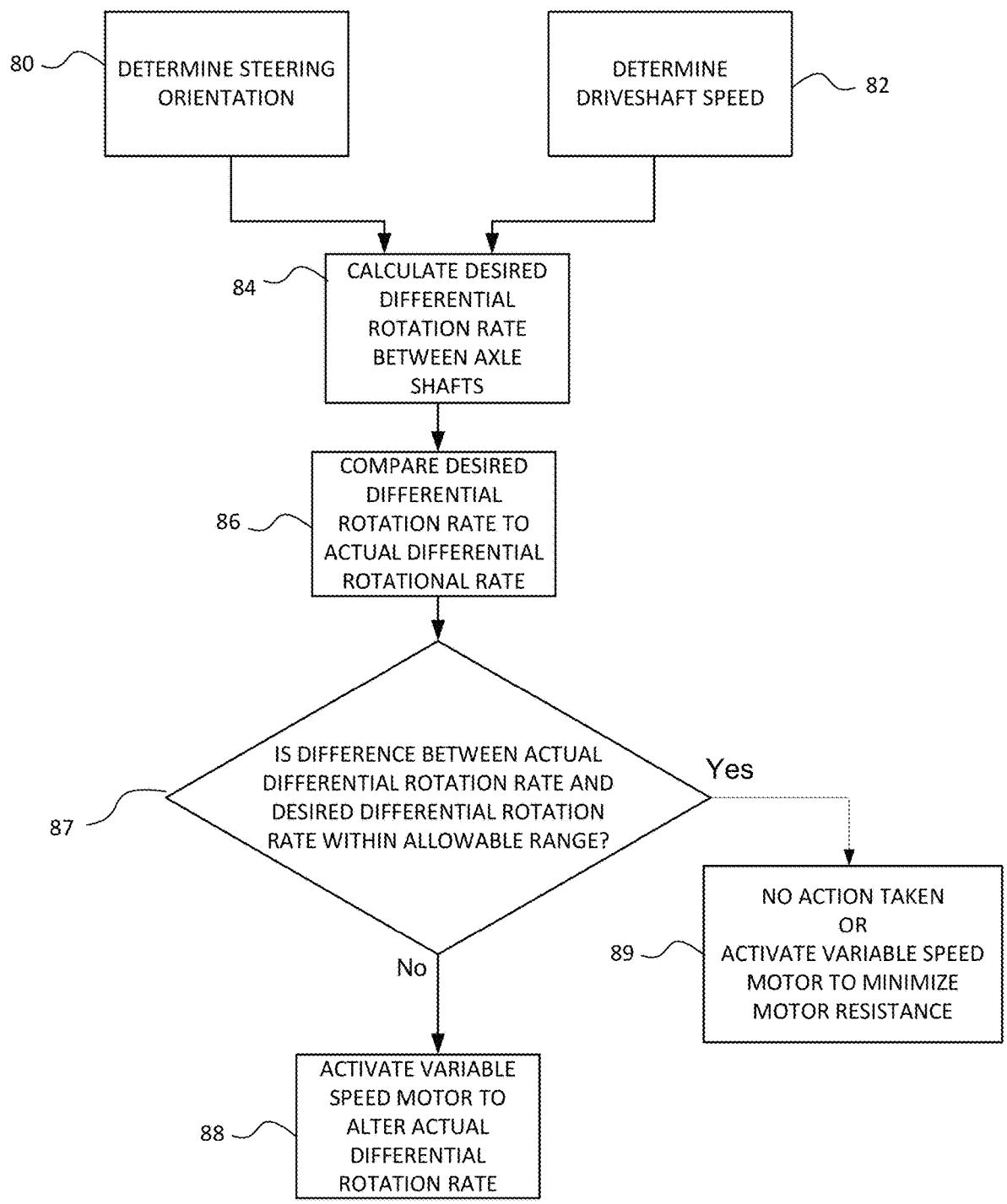
FIG. 5 is a block flow diagram showing an operating method in accordance with some embodiments.
Figure 6:
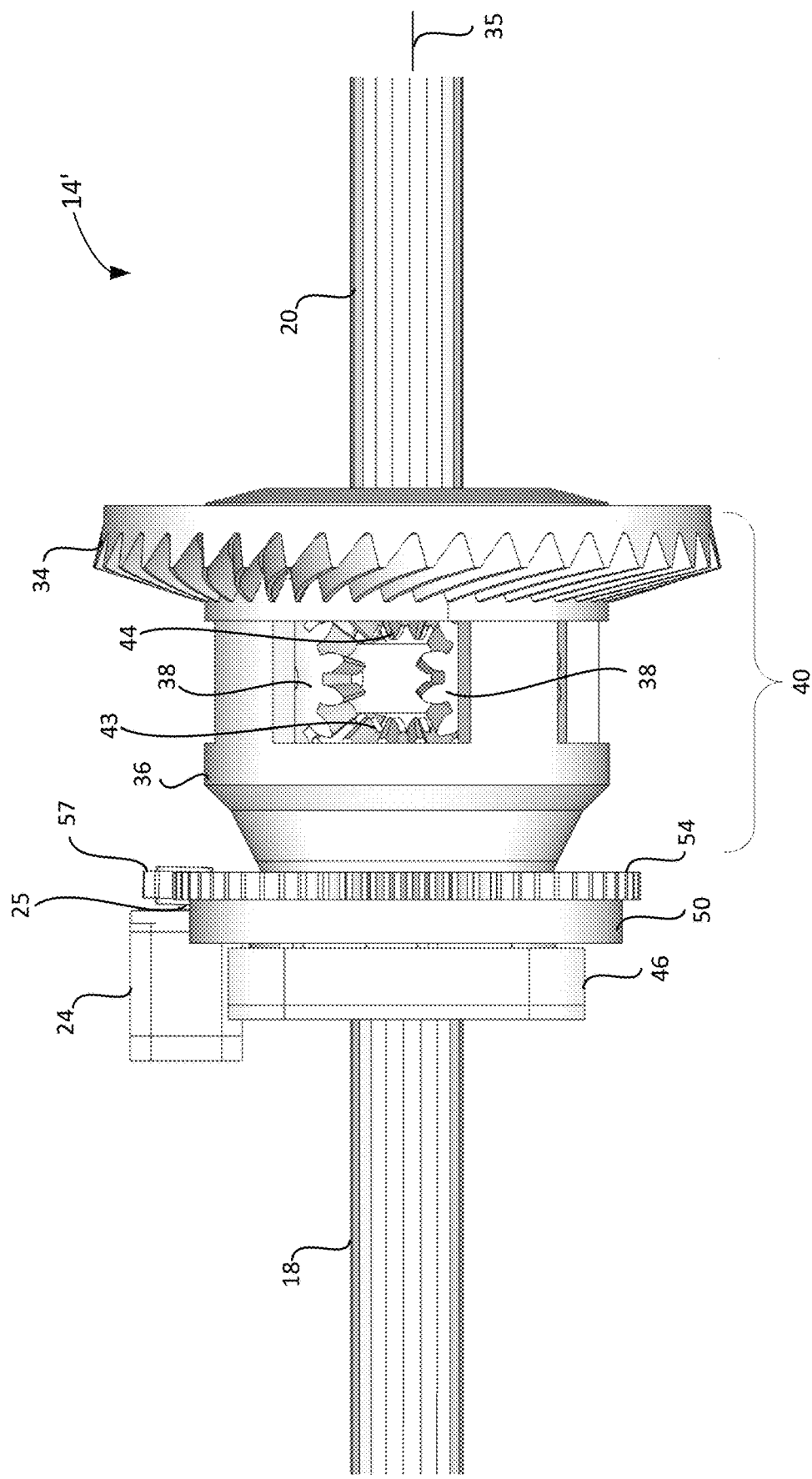
FIG. 6 is a side view of a second example embodiment of a gearing assembly.
Figure 7:
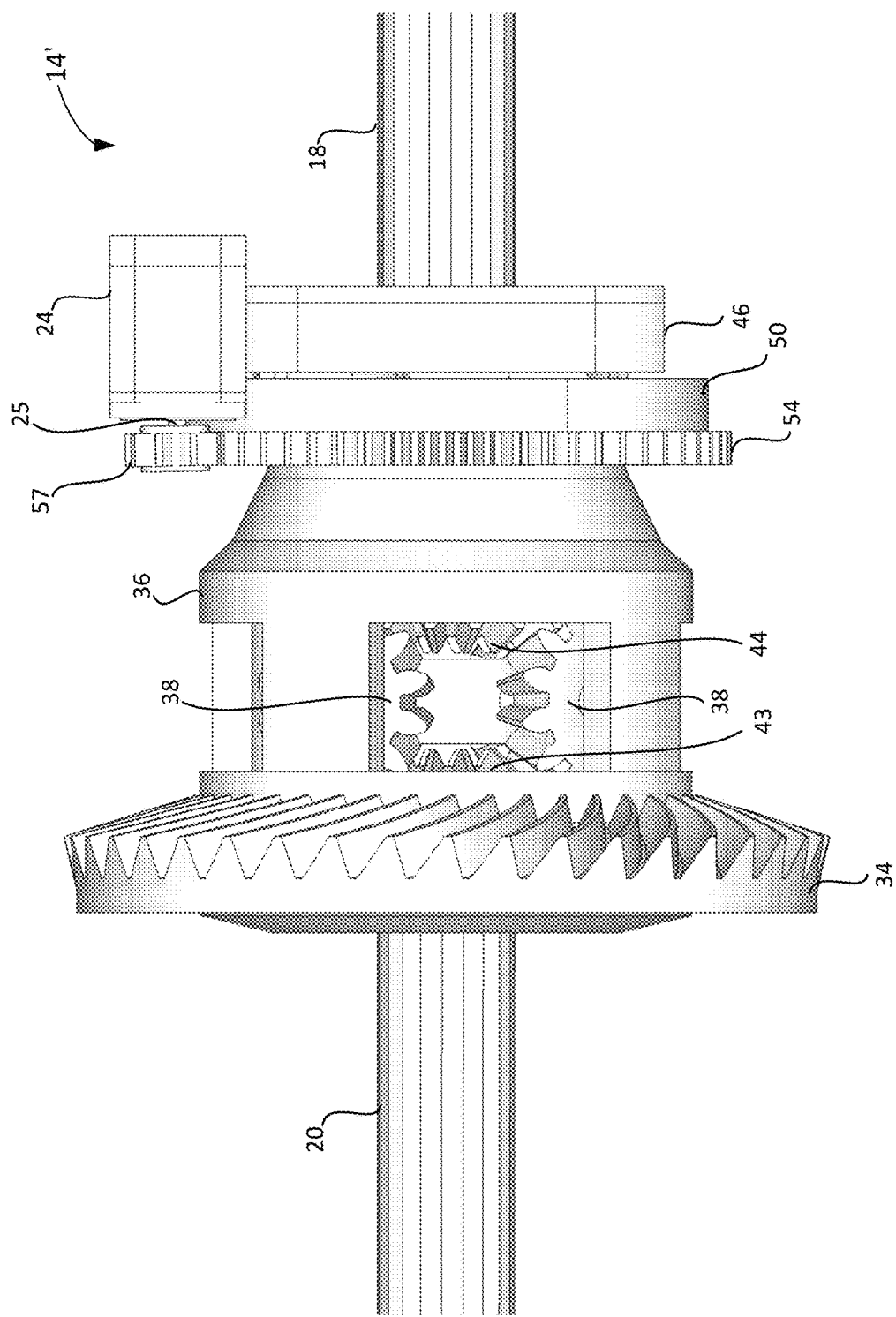
FIG. 7 is a reverse side view of the gearing assembly shown in FIG. 6.
Figure 8:
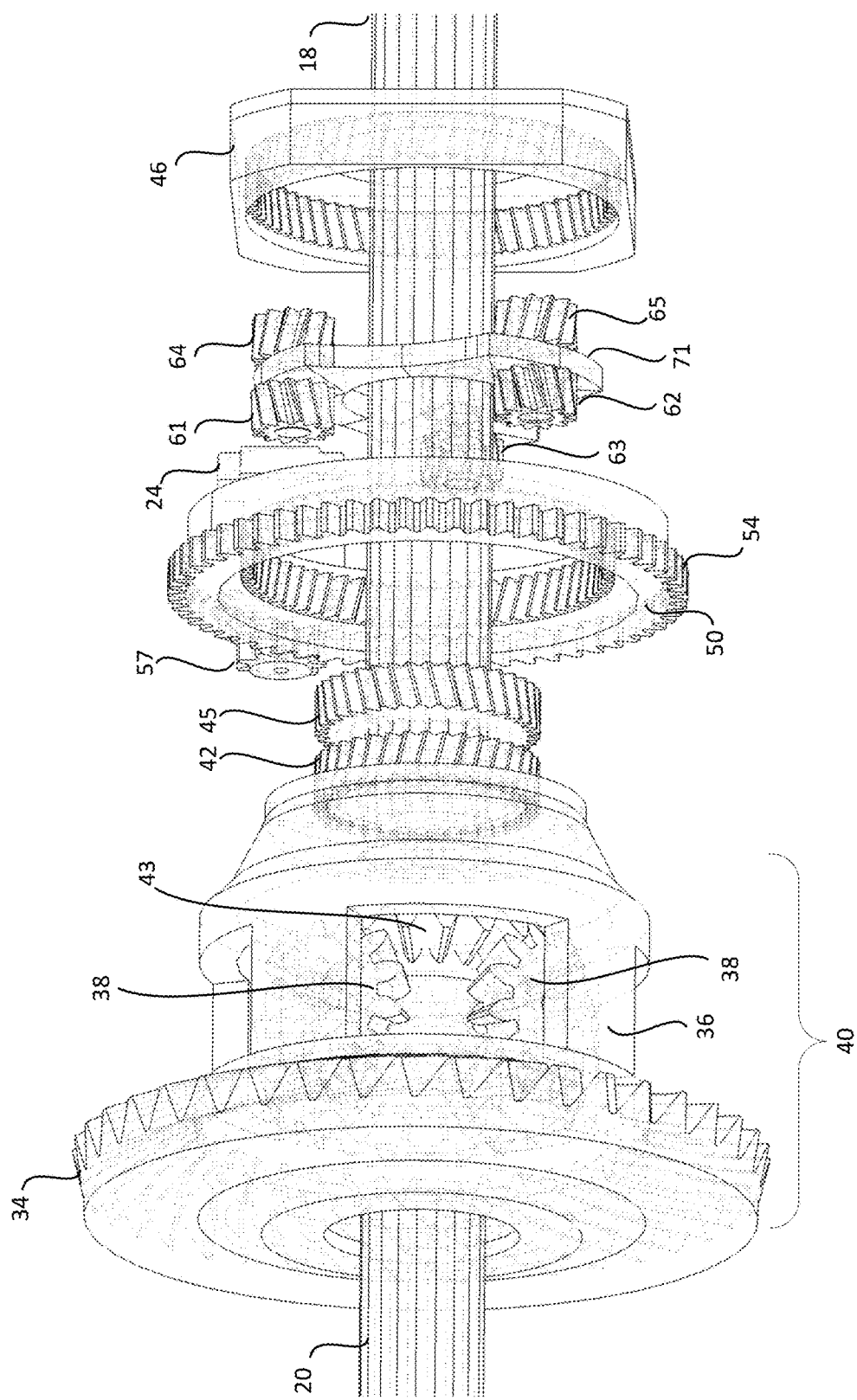
FIG. 8 is an exploded perspective view of the gearing assembly shown in FIG. 6.
Figure 9:
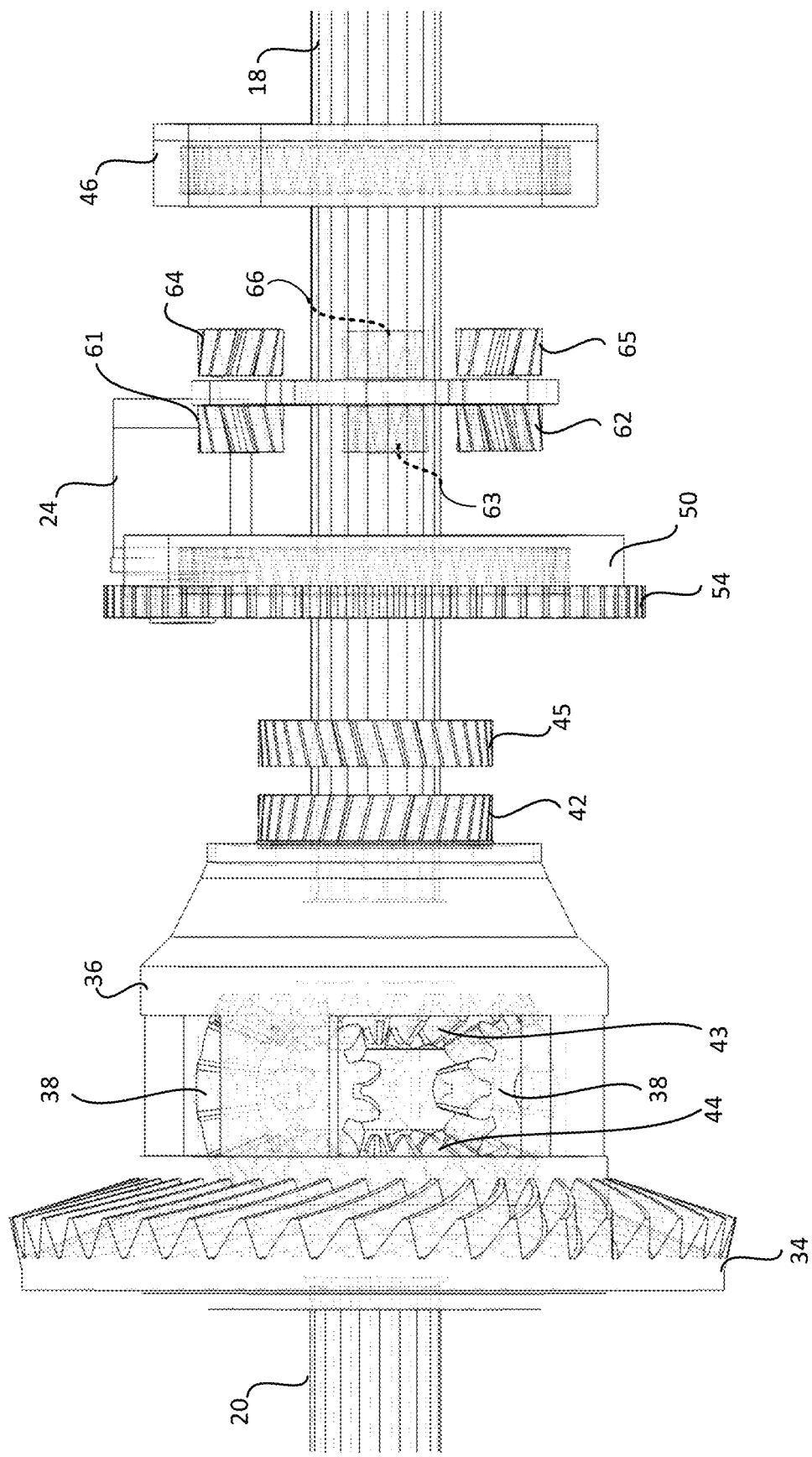
FIG. 9 is an exploded side view of the gearing assembly shown in FIG. 6.

A method of operating a system including a gearing assembly in accordance with some embodiments, is explained with respect to FIG. 5 in conjunction with FIG. 1. For illustrative purposes, the method is described with respect to FIG. 1, which shows a rear drive vehicle. One of ordinary skill in the art will appreciate that the method could be implemented in a front drive vehicle and the differential could be between the front axle shafts. Similarly, the method could be implemented in a center differential between forward and rear drive shafts in an all-wheel drive vehicle. By operating the variable speed motor 24, the differential rotational rate can be changed, specifically the rotational speed of one of the rear axle shafts 18 (or one of the front axle shafts for a front differential or one of the output drive shafts for a center differential) can be increased or decreased relative to the rotational speed of the other axle shaft 20 (or the other front axle shaft for a front differential or the other output drive shaft for a center differential), depending upon the direction and speed that the variable speed motor 24 turns.

Using the steering angle sensor 28, the engine computer 26 can determine if the vehicle 10 is configured to travel straight, configured to travel in a left turn, or configured to travel in a right turn. See Block 80. Furthermore, using the rotational velocity sensor 29, the RPMs of the driveshaft 12 can be determined. See Block 82. As is indicated by Block 84, the engine computer 26 calculates a desired differential rotation rate between the rotational speed of the first axle shaft 18 and the rotational speed of the second axle shaft 20, based, at least in part, on the steering angle of the vehicle and the rotational speed of the driveshaft 12. In some embodiments, the desired differential rotation rate is only calculated if the drive shaft has a nonzero rate of rotations per minute and the steering angle sensor indicates that the vehicle is configured to travel in a turn. The desired differential rotation rate is then compared to the actual differential rotation rate between the rotational speed of the first axle shaft 18 and the rotational speed of the second axle shaft. See Block 86.

A determination is made regarding whether a difference between the actual differential rotation rate and the desired differential rotational rate is within an allowable range. See Block 87 If the difference between the actual differential rotation rate and the desired differential rotational rate is within the allowable range, then, in some embodiments, no action is taken. See Block 89. In other embodiments, if the difference between the actual differential rotation rate and the desired differential rotation rate is within the allowable range, the variable speed motor may be activated to actively coordinate the rotation of the motor with the actual differential rotation rate to reduce motor resistance and favor greater steering agility. See Block 89. If the difference between the actual differential rotation rate and the desired differential rotational rate is not within the allowable range, a control signal value based on the difference is sent to the variable speed motor 24. The variable speed motor 24 then operates to speed up or slow down the actual rotational speed of the first axle shaft 18 so that the actual differential rotational rate more closely matches the desired differential rotational rate. See Block 88. This method may be implemented as a continuous closed-loop process. As such, the present invention system 10 governs the differential in rotation between the first axle shaft 18 and the second axle shaft 20 via the rotation of the control shaft 25 by the variable speed motor 24. Slipping due to unequal traction conditions will therefore be reduced or prevented.

Second Example Embodiment

FIGS. 6-9 depict a gearing assembly 14' of a second example embodiment. The gearing assembly 14' of FIGS. 6-9 includes many components that are the same as or similar to the components described above in relation to FIGS. 1-4, and therefore, uses many of the same reference numbers. Most of the description above with respect to the first example embodiment is applicable to the second example embodiment. Some differences between the embodiments are described below.

Instead of employing a worm gear connected with the control shaft 25 that engages an annular gear 50, the gearing assembly 14' employs a spur gear 57 connected to the control shaft 25 that engages an annular gear 50. Also, in the second example embodiment of the gearing assembly 14', the axis of rotation 25 of the control shaft is parallel to the axis of rotation 35 of the first axle shaft 18 and the second axle shaft 20. Further, the control shaft 25 is shorter and the variable speed motor 24 is closer to the gearing assembly 14'. This arrangement of the control shaft 25 axis of rotation being parallel to the axis of rotation 35 of the first and second axle shafts 18, 20 and the control shaft being coupled to a spur gear 57 (instead of a worm gear) that engages the annular gear 50 is generally more compact and more lighter weight than the arrangement of the corresponding components in the first example embodiment. Additionally, this arrangement in the second example embodiment of the gearing assembly 14' is better able to accommodate a wider range of allowable differential rates because forces that resist implementing the calculated desired rate are not blocked by the one-way nature of the worm gear. Instead, the spur gear 57 communicates these forces through the control shaft 25 to the variable speed motor, where they may be allowed by the control algorithm to change the rotation rate of the variable speed motor if they fall within the allowable range, or resisted by the motor if they exceed the allowable range.

In the second example embodiment of the gearing assembly 14', the teeth of many of the gears have a different configuration than those of the corresponding elements in the first example embodiment. For example, in the second example embodiment the teeth of the stationary internal gear 46 are helical. The interior gear teeth 52 of the annular gear 50 or ring gear are also helical in gearing assembly 14'. In the first example embodiment, the gear 45 attached to the first axle shaft 18 is a spur gear; however, in the second embodiment the gear is a helical spur gear 45. In the first example embodiment, the planetary gears 61, 62, 63, 64, 65, 66 are each spur gears. In gearing assembly 14', the planetary gears 61, 62, 63, 64, 65, 66 are each helical spur gears. In gearing assembly 14' the sun gear 42 has helical teeth. The use of helical teeth for these gears may be advantageous because, generally, helical gears are quieter and may carry more load than straight cut gears.

The arrangement of the first set of planetary gears 61, 62, 63 and the second set of planetary gears 64, 65, 66 with respect to the gear carrier 71 is different in the second example embodiment than in the first example embodiment. For example, in the first example embodiment, the gear carrier for the planetary gears includes two endplates 70 with all the planetary gears between them. In the second example embodiment, the gear carrier 71 separates the first set of planetary gears 61, 62, 63 from the second set of planetary gears 64, 65, 66.

In the second example, embodiment gear carrier 36 of the differential 40 has a different shape than that of the miter gear carrier 36 in the first example embodiment. Also the differential includes four miter gears 38 in the second embodiment, as opposed to two miter gears in the first embodiment. in the second example embodiment of the gearing assembly 14'.

One of ordinary skill in the art will appreciate that various components of the gearing assemblies described herein can be modified or substituted with equivalent components or groupings of components, and that such substitutions and modifications fall within the scope of the invention.

Details Regarding Operation of the Steering Differential System

One of the goals of some embodiments of systems and gearing assemblies described herein as applied to a vehicle equipped with Ackerman steering geometry is to mechanically achieve a calculated differential rate that is in close agreement with the vehicle's natural differential rate at any given steering angle and velocity, assuming that the differential rates are not modified to change the vehicle's handling behavior, and natural assumes a vehicle with Ackerman geometry and similar tire sizes turning on a flat surface with no wheel slip. In most circumstances, this natural differential rate corresponds to the "desired" differential rate.

In some embodiments, deviation from this desired differential rate is not permitted, and thus external influences such as unequal traction conditions will have no effect on the system. In this sense, the system or gearing assembly will behave similar to a welded axle (or locked differential) in low traction conditions without suffering from the welded or locked axle's inability to allow different rates of rotation during a turn.

Physical control of the differential rate is provided through a differential control shaft (DCS). The differential control shaft is also referred to as a "control shaft" herein.

The following table shows the relationship between the differential control shaft, the drive shaft, and the behavior of the vehicle.

TABLE 1

Relationship between the shafts and behavior of the vehicle

| | Drive Shaft in motion | Drive Shaft at rest |
|---|---|---|
| Differential control shaft at rest | Vehicle traveling in straight line | Vehicle at rest |
| Differential control shaft in motion | Vehicle in motion and turning | |

A vehicle that is equipped with an Ackerman steering geometry and with equal-sized tires will show no significant differential activity at a standstill or while traveling in a straight line. As the vehicle executes a turn, the amount that the internal gears of an open differential rotate in order to accommodate the different turning radii of the inside and outside wheels, will be proportional to the vehicle's steering angle and velocity. On a flat, dry surface, there is a distinct relationship between steering angle, velocity, and differential rate. This rate is referred to herein as the desired differential rate of the vehicle.

Figure 12:
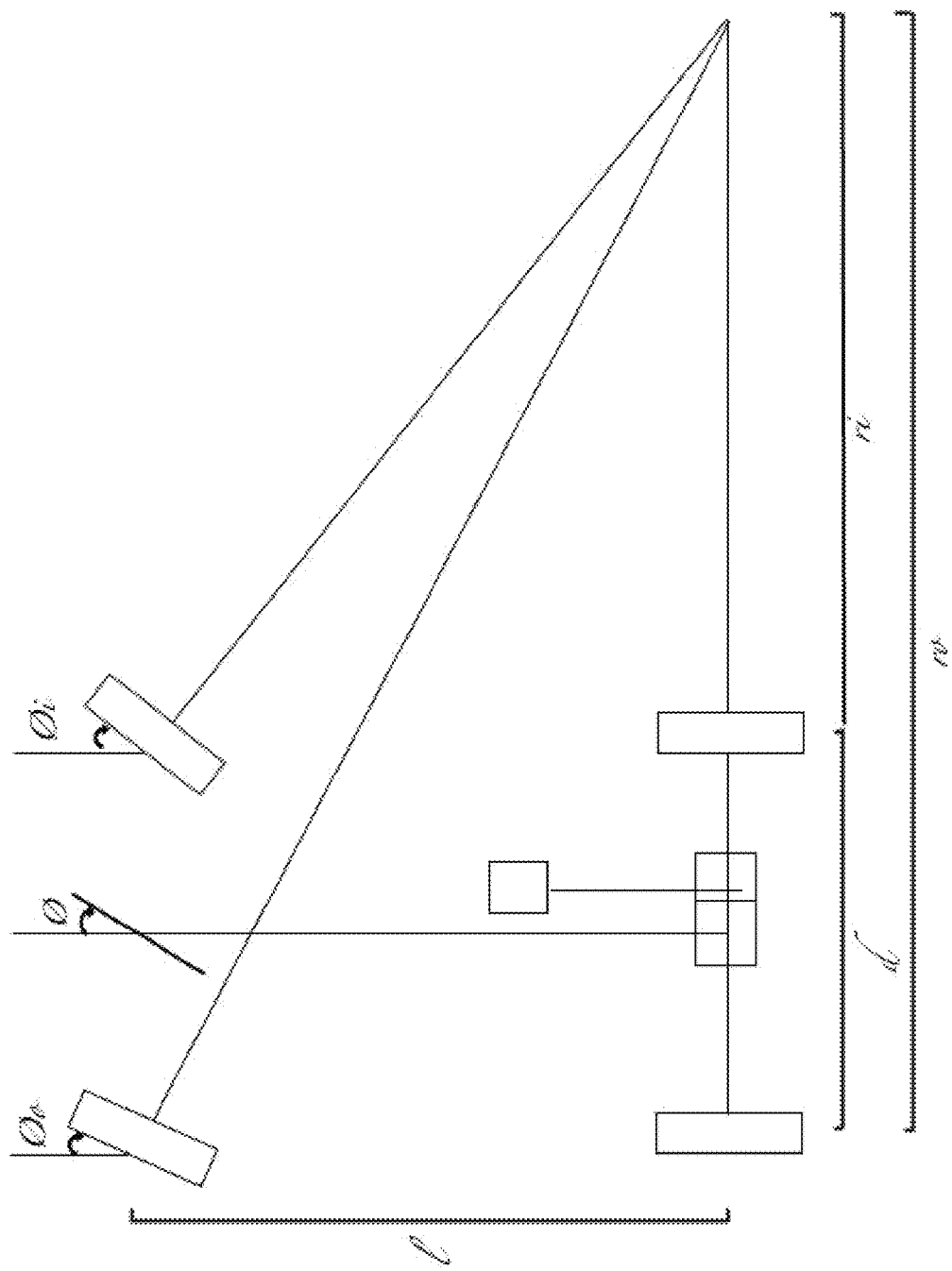
FIG. 12 illustrates the parameters used in calculating the desired difference in rotational velocity for the rear differential according to FIG. 11.

In addition to steering angle and velocity, a vehicle's desired differential rate also depends on its wheelbase and width. For description purposes, the vehicle wheelbase is referred to as l, and the vehicle width is referred to as d. The vehicle width d is measured from the center of the left wheel to the center of the right wheel and in the same units as the wheelbase l. Also for description purposes, the steering angle is referred to as Ø, and rotations per minute of the center axle is RPM. FIG. 12 illustrates these variables when calculating a rear differential rate.

RPM of the center axle is often a precise and accurate measure that is capable of detecting small fractions of rotations. It also is a vector quantity, able to detect not only the magnitude but also the direction of rotation, for example +26.215 RPM or −0.218 RPM, where + and − are used as direction indicators for use in equations. As used herein, a positive RPM is corresponds with forward vehicle motion and a negative RPM corresponds with reverse vehicle motion.

The steering angle Ø is provided in degrees from parallel with chassis, so traveling in a straight line provides Ø=0°. A moderate right turn would be Ø=20° and a moderate left turn would be Ø=−20°. This Ø angle is that of an imaginary wheel between the two turning wheels and can be easily measured from the steering column or rack of the vehicle.

When the vehicle is not in motion or when Ø is equal to zero, the desired differential rate will also be zero. In these situations, the angular velocity of all four wheels is the same and no differential motion is desired. In embodiments that employ a worm gear or another mechanism that prevents the annular gear 50 or control shaft 25 from rotating when the desired differential rate is zero, even when unequal traction conditions work against the desired zero differential rate, the mechanism will prevent these conditions from changing the actual differential between the first axle shaft and the second axle shaft away from the desired zero differential. For example, consider a situation where a vehicle has one wheel on ice and the opposite wheel on asphalt. Power is applied to the drive shaft and the steering wheels are pointed straight. Because there is a steering angle of zero, no differential activity is desired, and it is desirable for the wheels on both sides to turn at equal speeds. Thus, in this case, the differential control shaft is at rest. However, the unequal traction conditions are not favorable for both wheels turning at equal speeds. The wheel on ice wants to turn faster because it has less friction but this deviation from the desired differential rate is prevented by controlling rotation of the differential control shaft, and thus power is delivered equally as if the wheels were locked together.

When RPM is non-zero and Ø is non-zero, the desired differential rate will also be non-zero. This differential rate is a vector quantity referred to as herein in revolutions per minute, RPMDiff difference in the rotational speed of one axle shaft relative to the other axle shaft. In examples described herein it is the right (passenger) side of the vehicle. However, in other embodiments this could be reversed. The sign of RPMDiff indicates the direction of rotation (clockwise or counter-clockwise) of the differential input on that side of the driving axle. For example, a vehicle with a differential control shaft mounted on the right side of the axle will need a positive (additive) input if it is moving forward and making a left turn. This is because the right side of the vehicle needs to move faster than the left side in order to cover the larger radius, so an additional rotational speed is provided to that side. This also results in an equal and opposite effect on the left wheel. If the vehicle remains at the same speed but makes a right turn of equal intensity, the sign of RPMDiff will be reversed. When the vehicle travels in reverse, the sign must also be reversed in order to preserve the additive or subtractive nature of RPMDiff.

TABLE 2

Direction and effect of RPMDiff with right axle configuration

|  | Positive RPM (forward) | Negative RPM (reverse) |
| --- | --- | --- |
| Right turn (positive Ø) | −, subtractive | +, subtractive |
| Left turn (negative Ø) | +, additive | − additive |

Note that RPMDiff may not equal the RPM of the differential control shaft. The variable speed motor must rotate the differential control shaft so that the RPM of the right axle either increases or decreases by the amount of RPMDiff. Actual RPM of the control shaft will differ due to factors such as the gearing reduction; however, the rotation of the control shaft is directly proportional to RPMDiff.

Figure 10:
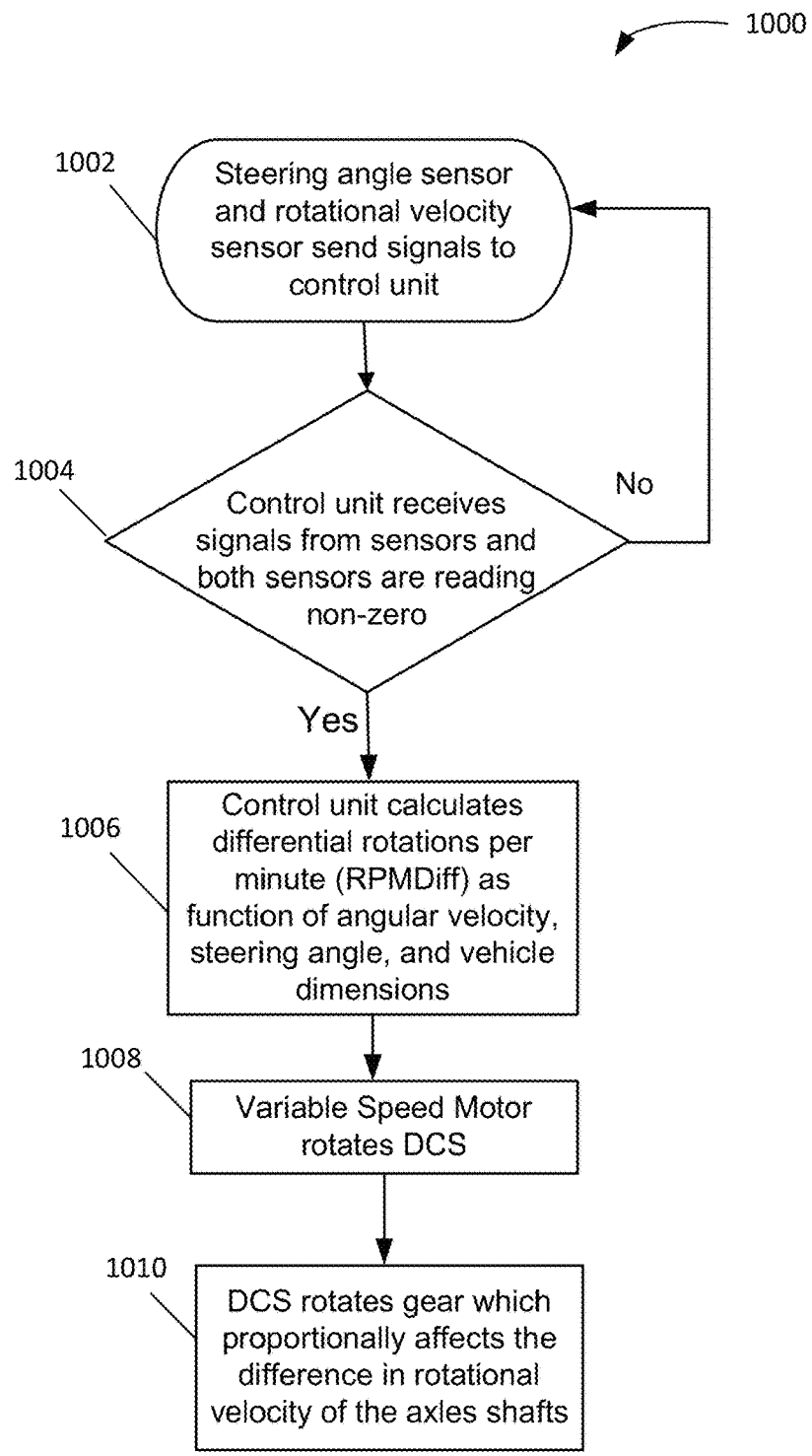
FIG. 10 is a flowchart of a method for calculating a desired difference in rotational velocity in accordance with some embodiments.

FIG. 10 is a flowchart for an example method 1000 for calculating a desired difference in rotational velocity according to an example embodiment. At step 1002, the steering angle sensor and the rotational velocity sensor send signals to the control unit of a vehicle. The control unit may be a computer of the vehicle 26, or a separate control unit. At step 1004, the control unit determines if both of the received signals (from step 1002) are reading non-zero. In some embodiments, the control unit instead determines if both signals are outside of specified ranges around zero. If both signals are non-zero (or outside specified ranges around zero), then the method 1000 continues to step 1006, otherwise, the method 1000 returns to step 1002.

At step 1006, the control unit calculates differentials rotations per minute (referred to herein as RPMDiff). The differential rotations per minute is calculated as function of driveshaft angular velocity, steering angle, and vehicle dimensions. At step 1008, the variable speed motor rotates the drive shaft (DCS) 25. At step 1010, the DCS 25 rotates the gear 56 which proportionally affects the difference in rotational velocity of the axle shafts. This method may be implemented as a continuous closed-loop process.

Figure 11:
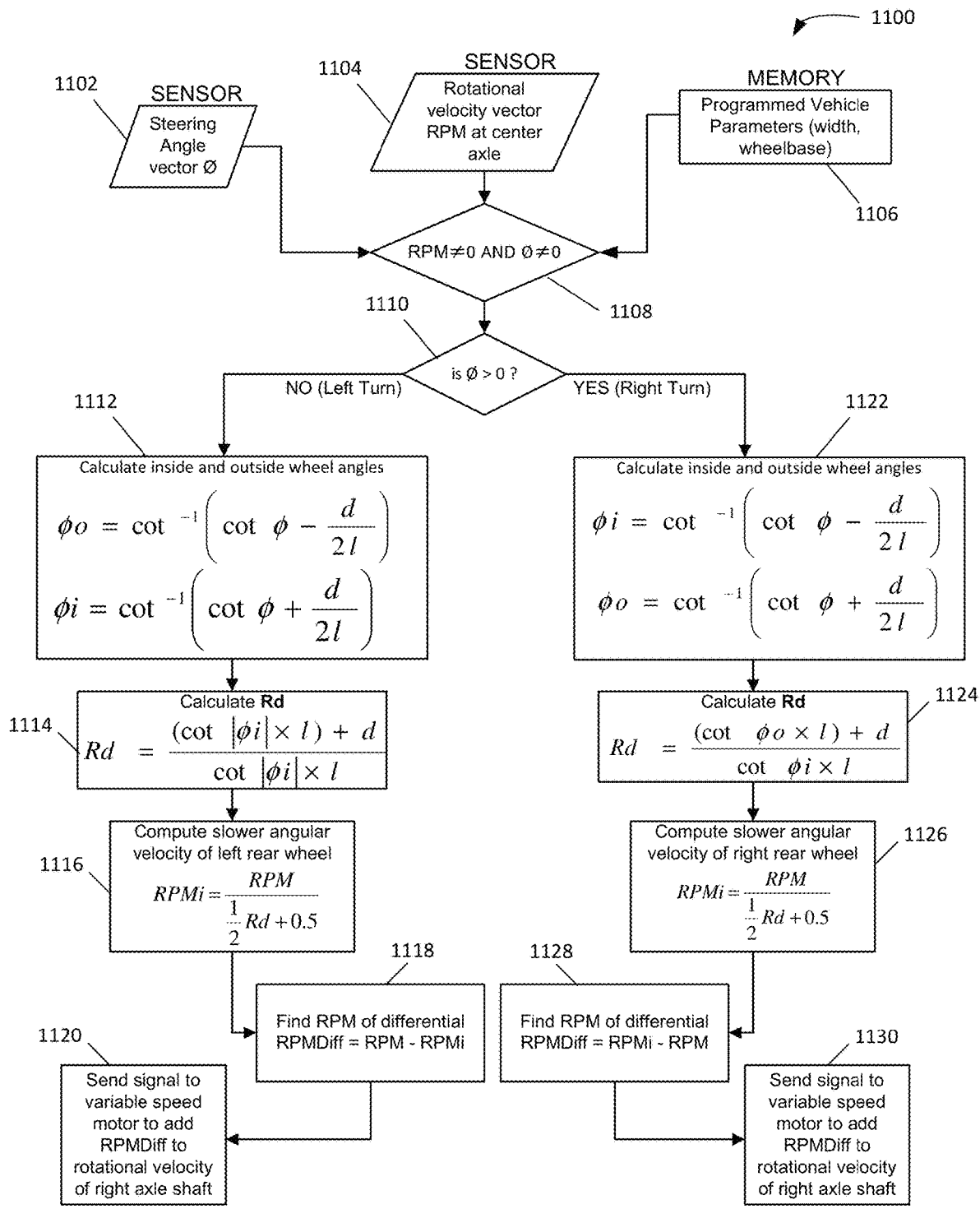
FIG. 11 is a flowchart of a method for controlling a difference in rotational velocity between rear axle shafts in a vehicle having a rear differential in accordance with some embodiments.

FIG. 11 is a flowchart for a method 1100 for controlling a difference in rotational velocity between rear axle shafts in a vehicle having a rear differential in accordance with some embodiments. FIG. 12 illustrates the parameters used in calculating the desired difference in rotational velocity for the rear differential according to FIG. 11.

For the rear differential, the value of RPMDiff can be calculated through the method 1100 which is schematically depicted in FIG. 11. At step 1102, sensor data is received indicating the steering angle Ø. At step 1104, sensor data is received indicating rotational velocity (RPM) at the center axle. At step 1106, the vehicle parameters, such as width (d) and wheelbase (l), are retrieved from the vehicle memory.

At step 1108, it is determined whether the steering angle Ø and the RPM are nonzero values (that is, the vehicle is in motion and turning). In some embodiments, the control unit instead determines if the steering angle Ø and the RPM are both outside of specified ranges around zero. If both values are non-zero (or outside specified ranges around zero), the method 1100 continues to step 1110. At step 1110, it is determined whether the steering angle is positive or negative, that is, whether the vehicle is turning right or turning left respectively.

If the steering angle Ø is positive, meaning that is the vehicle is turning right, then the method 1100 continues to step 1122. At step 1122, the inside $Ø_i$ and outside $Ø_o$ wheel angles are calculated as a function of the width d and the wheelbase l. These parameters are illustrated in FIG. 12. Using the Ackerman expressions (equations 1.1 and 1.2 below), the angle of either the inside Øi or the outside Øo wheel can be determined based on a given Ø.

For a right turn where Ø>0:

$$Øo = \cot^{-1}\left(\cot Ø + \frac{d}{2l}\right) \text{ and} \qquad \text{Equation 1.1}$$

$$Øi = \cot^{-1}\left(\cot Ø - \frac{d}{2l}\right)$$

For a left turn where Ø<0:

$$Øo = \cot^{-1}\left(\cot Ø - \frac{d}{2l}\right) \text{ and} \qquad \text{Equation 1.2}$$

$$Øi = \cot^{-1}\left(\cot Ø + \frac{d}{2l}\right)$$

The difference in travel distance between the inside (right) wheel and the outside (left) wheel can be expressed as a ratio, Rd. At step 1124, Rd is calculated as shown below in equation 2.3 by dividing the outside turn radius ro by the inside turn radius ri (see FIG. 12 for illustration of ri and ro). For a right turn calculation of RPMDiff, where Ø>0, ri is calculated as follows:

$$ri = \cot Øi * l \qquad \text{Equation 2.1}$$

ro is calculated as follows:

$$ro = (\cot Øi * l) + d \qquad \text{Equation 2.2}$$

and

-continued $$Rd = \frac{ro}{ri} \quad \text{Equation 2.3}$$

Rd will decrease and approach 1 as the steering angle decreases. The greater the steering angle, the more difference there is between the inside and outside radius, and the greater the value of Rd. At step 1126, using Rd and RPM in the equation 2.4 provides the slower angular velocity of the right rear wheel:

$$RPMi = \frac{RPM}{\frac{1}{2}Rd + 0.5} \quad \text{Equation 2.4}$$

At step 1128, RPMDiff is calculated as the RPM difference between the right wheel and the middle axle. This can be found by subtracting RPM from RPMi:

RPMDiff=RPMi−RPM   Equation 2.5

This gives a negative value of RPMDiff, which is appropriate in this case because this is subtracted from the forward RPM on the right side during a right hand turn.

At step 1130, the control unit sends a signal to the variable speed motor to add RPMDiff to the rotational velocity of the right axle shaft.

At step 1110 if the steering angle Ø is negative, meaning that the vehicle is turning left, then the method 1100 continues to step 1112. At step 1112, the inside $Ø_i$ and outside $Ø_o$ wheel angles are calculated as a function of the width d and the wheelbase l. These parameters are illustrated in FIG. 12. At step 1114, Rd is calculated as a function of $Ø_i$, $Ø_o$, l and d.

At step 1116, using Rd and RPM provides the slower angular velocity of the left rear wheel. At step 1118, RPMDiff is calculated for a left turn, where Ø<0, ri, ro and RPMDiff are calculated as follows:

ri=cot|Øi|*l   Equation 2.6 ro=(cot|Øi|*l)+d   Equation 2.7

RPMDiff=RPM−RPMi   Equation 2.8

The order of subtraction for RPMDiff is flipped since the differential input is still on the right side, but the inside wheel is now the left, instead of the right.

At step 1120, the control unit sends a signal to the variable speed motor to add RPMDiff to the rotational velocity of the right axle shaft.

Figure 13:
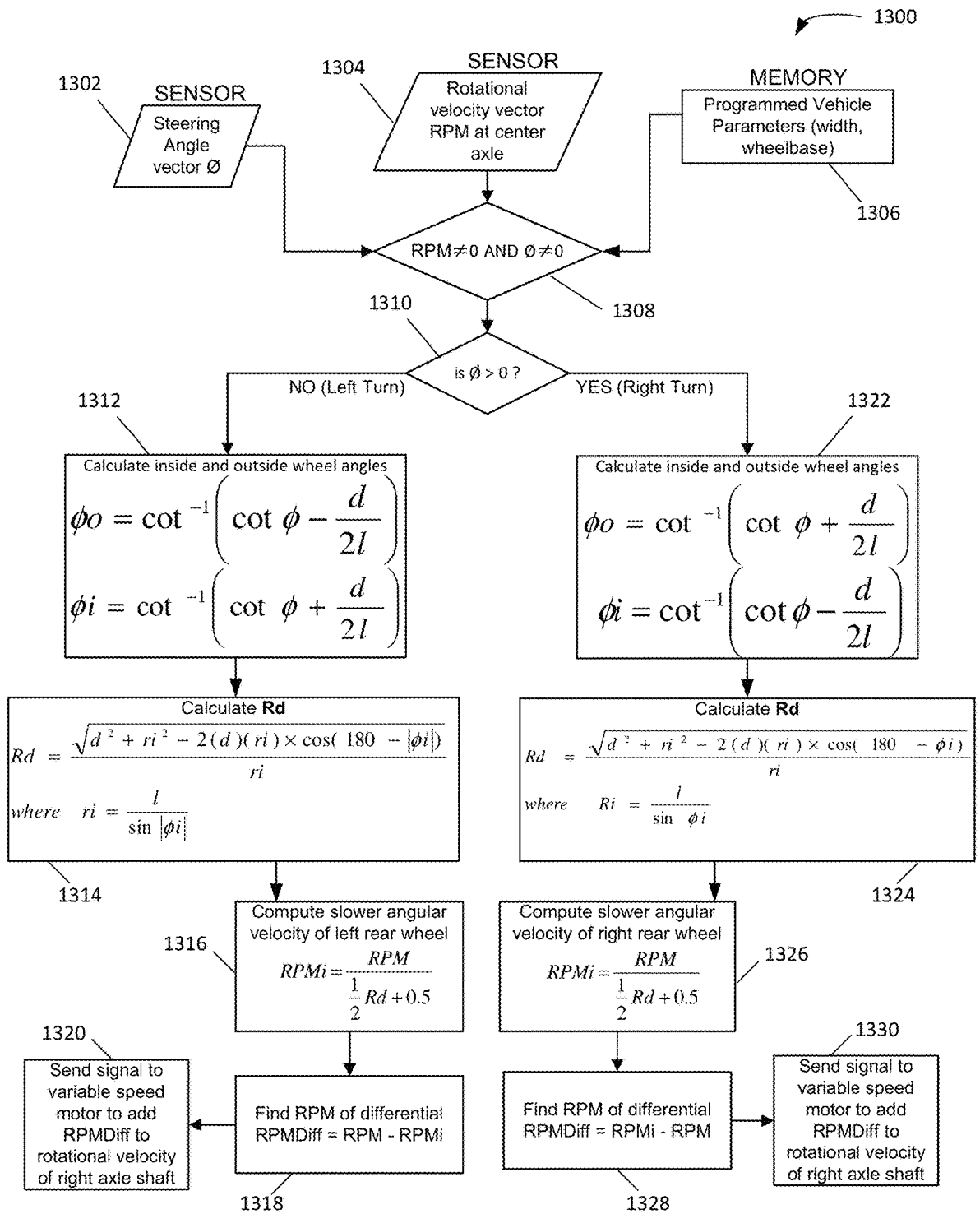
FIG. 13 is a flowchart of a method for controlling a difference in rotational velocity between front axle shafts in a vehicle having a front differential in accordance with some embodiments.
Figure 14:
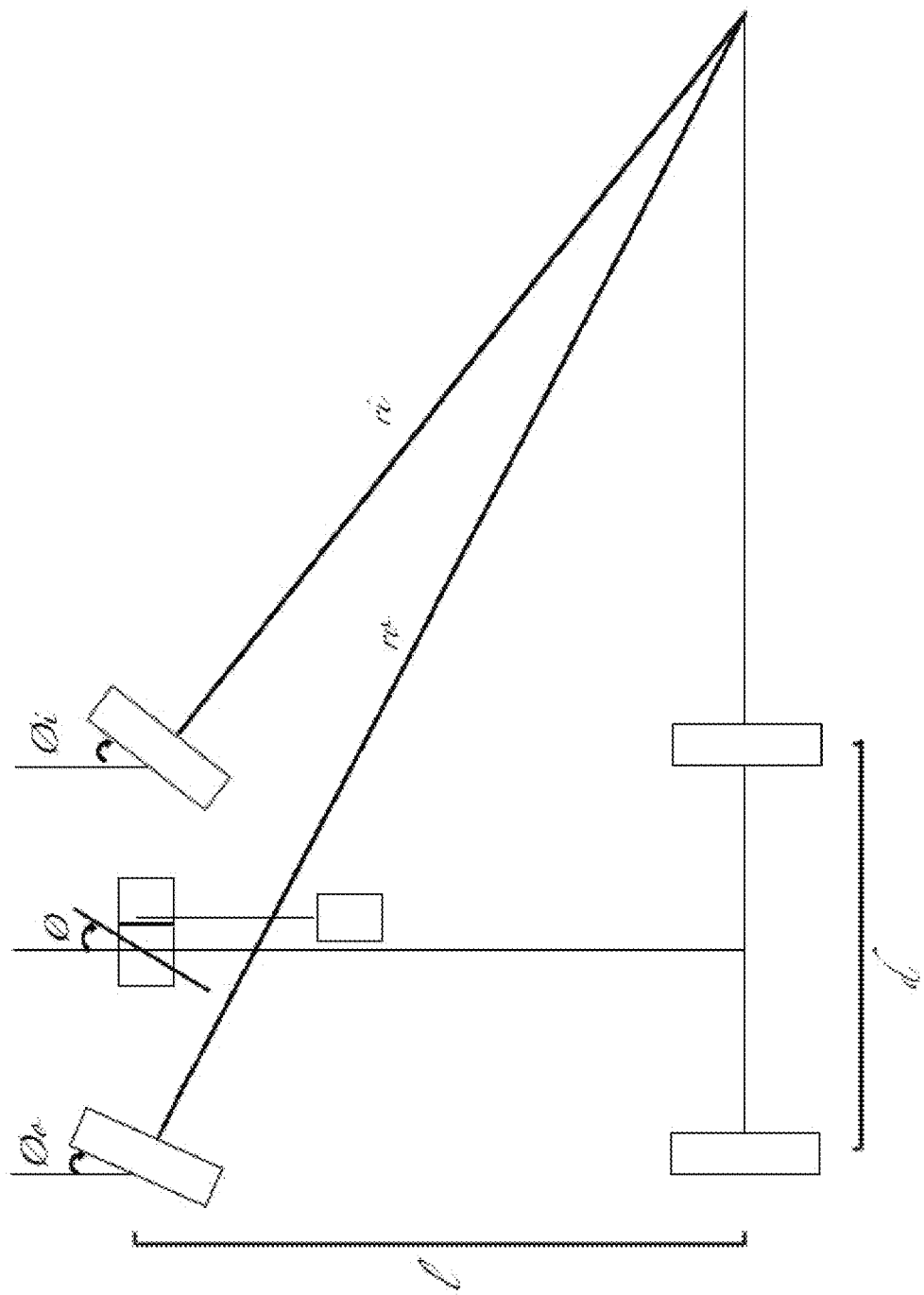
FIG. 14 illustrates the parameters used in calculating the desired difference in rotational velocity for the front differential according to FIG. 13.

FIG. 13 is a flowchart for method 1300 for controlling a difference in rotational velocity between front axle shafts in a vehicle having a front differential in accordance with some embodiments. FIG. 13 is a flowchart for an example method 1300 for calculating a desired difference in rotational velocity for a front differential. FIG. 14 illustrates the parameters used in calculating the desired difference in rotational velocity for the front differential according to FIG. 13.

For the front differential, the value of RPMDiff can be calculated through the below steps (also illustrated in FIG. 13). At step 1302, sensor data is received indicating the steering angle Ø. At step 1304, sensor data is received indicating rotational velocity (RPM) at the center axle. At step 1306, the vehicle parameters, such as width (d) and wheelbase (l), are retrieved from the vehicle memory.

At step 1308, it is determined whether the steering angle Ø and the RPM are nonzero values (that is, the vehicle is in motion and turning). In some embodiments, the control unit instead determines if the steering angle Ø and the RPM are both outside of specified ranges around zero. If these values are nonzero (or outside specified ranges around zero), the method 1300 continues to step 1310. At step 1310, it is determined whether the steering angle is positive or negative, that is, whether the vehicle is turning right or turning left respectively.

If the steering angle Ø is positive, meaning that the vehicle is turning right, then the method 1300 continues to step 1322. At step 1322, the inside $Ø_i$ and outside $Ø_o$ wheel angles are calculated as a function of the width d and the wheelbase l. These parameters are illustrated in FIG. 14.

The difference in travel distance between the inside (right) front wheel and the outside (left) front wheel can be expressed as a ratio, Rd. At step 1324, Rd is calculated as shown below in equation 3.3 by dividing the outside turn radius ro by the inside turn radius ri (see FIG. 14 for illustration of ri and ro). It should be noted that the ri and ro values for the front wheels are different from those for the rear wheels. For a right turn calculation of RPMDiff, where Ø>0, ri and ro are calculated as follows:

$$ri = \frac{l}{\sin Øi} \quad \text{Equation 3.1}$$

$$ro = \sqrt{d^2 + ri^2 - 2d*ri*\cos(180 - Øi)} \quad \text{Equation 3.2}$$

$$Rd = \frac{ro}{ri} \quad \text{Equation 3.3}$$

Note that in some embodiments ro can also be calculated using the Pythagorean theorem ro=$\sqrt{l^2+ro_r^2}$ where $ro_r$ is the outside turn radius of the rear wheel.

Rd will decrease and approach 1 as the steering angle decreases. The greater the steering angle, the more difference there is between inside and outside radius, and the greater the value of Rd. Using an adjusted value of Rd corrects for the different angular velocity of the right front wheel during the turn. At step 1326, using Rd and RPM in the following equation provides:

$$RPMi = \frac{RPM}{\frac{1}{2}Rd + 0.5} \quad \text{Equation 3.4}$$

At step 1328, RPMDiff is the angular velocity differences between the middle of the axle and the right wheel. This can be found by subtracting RPM from RPMi:

RPMDiff=RPMi−RPM   Equation 3.5

At step 1330, the control unit sends a signal to the variable speed motor to add RPMDiff to the rotational velocity of the right axle shaft.

At step 1310 if the steering angle Ø is negative, that is the vehicle is turning left, then the method 1300 continues to step 1312. At step 1312, the inside $Ø_i$ and outside $Ø_o$ wheel angles are calculated as a function of the width d and the wheelbase l. These parameters are illustrated in FIG. 14. At step 1314, Rd is calculated as a function of $Ø_i$, $Ø_o$, l and d.

At step 1316, using Rd and RPM provides the slower angular velocity of left rear wheel. At step 1318, RPMDiff is calculated for a left turn, where Ø<0, ri, ro and RPMDiff are calculated as follows:

$$ri = \frac{l}{\sin|\emptyset i|} \quad \text{Equation 3.6}$$

$$ro = \sqrt{d^2 + ri^2 - 2d * ri * \cos(180 - |\emptyset i|)} \quad \text{Equation 3.7}$$

$$RPMDiff = RPM - RPMi \quad \text{Equation 3.8}$$

The order of subtraction for RPMDiff is flipped since the differential input is still on the right side, but the inside wheel is now the left, instead of the right.

At step 1320, the control unit sends a signal to the variable speed motor to add RPMDiff to the rotational velocity of the right axle shaft.

Figure 15:
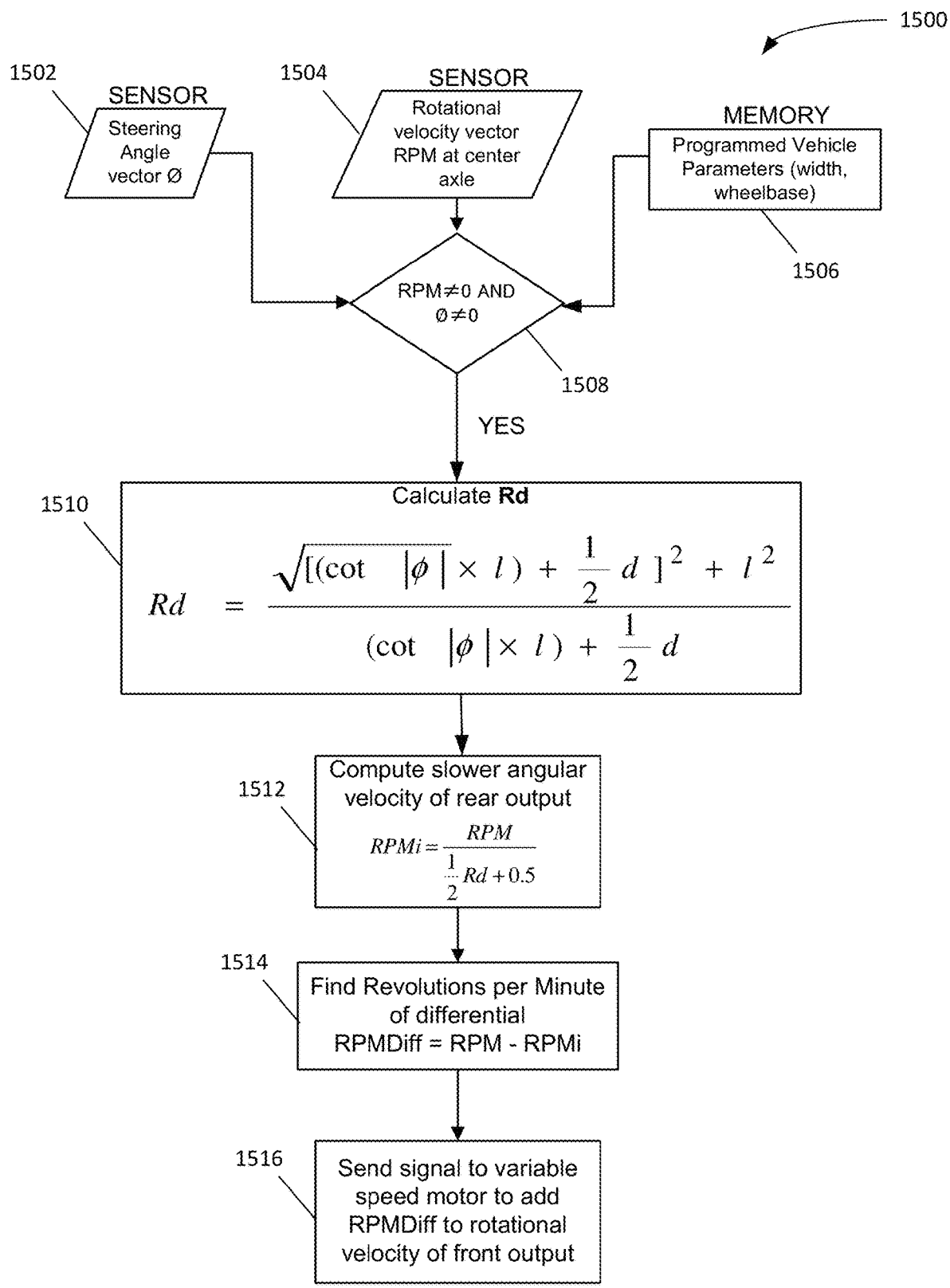
FIG. 15 is a flowchart of an example method for calculating a desired difference in rotational velocity between a front axle shaft and a back axle shaft for vehicle having a center differential in accordance with some embodiments.
Figure 16:
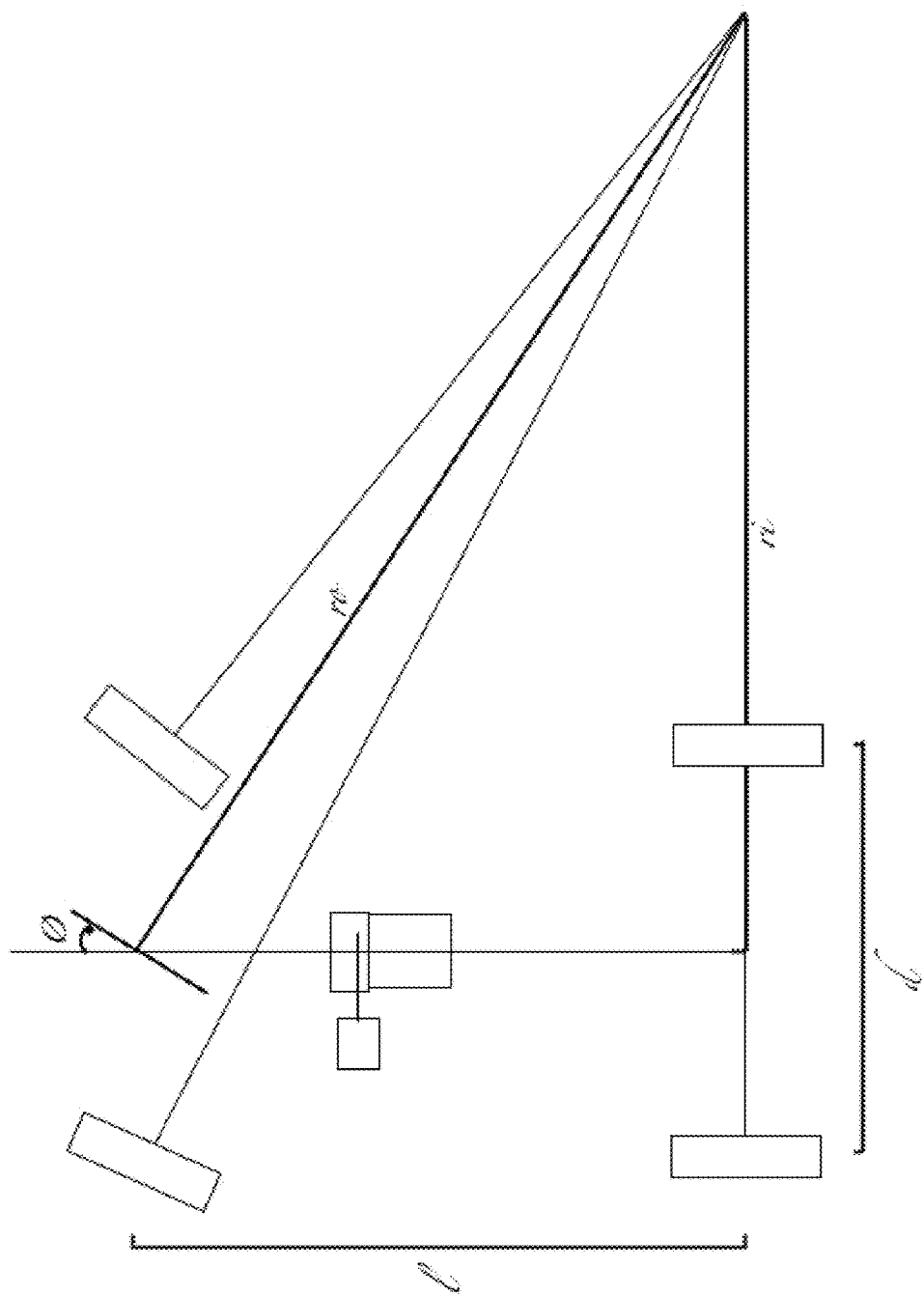
FIG. 16 illustrates the parameters used in calculating the desired difference in rotational velocity for the center differential according to FIG. 15.

FIG. 15 is a flowchart for an method 1500 for controlling a difference in rotational between a front and rear output drive shafts in a vehicle having a center differential in accordance with some embodiments. FIG. 16 illustrates the parameters used in calculating the desired difference in rotational velocity for the center differential according to FIG. 15.

In all-wheel drive applications there is a center differential to accommodate the different radii between the front and rear axles during a turn. When there is a front, rear and center differential, the rotational velocity of the input to the center differential (the output from the transmission) is used as RPM which, through calculations, can provide the RPM of the center differential's front and rear output shafts, at any given steering angle and velocity. These values can then serve as the RPM for calculating RPMdiff values for the front and rear differentials described above, thus allowing differential rates for all three differentials to be calculated from a single rotational velocity measurement.

For the center differential, the value of RPMDiff can be calculated through the below steps (also illustrated in FIG. 15). At step 1502, sensor data is received indicating the steering angle Ø. At step 1504, sensor data is received indicating rotational velocity (RPM) at the center axle. This RPM is often a precise measurement capable of detecting small fractions of rotations. It is also a vector quantity with the sign indicating direction (+ indicates forward, − indicates reverse). At step 1506, the vehicle parameters, such as width (d) and wheelbase (l), are retrieved from the vehicle memory.

At step 1508, it is determined whether the steering angle Ø and the RPM are nonzero values (that is, the vehicle is in motion and turning). In some embodiments, the control unit instead determines if the steering angle Ø and the RPM are both outside of specified ranges around zero. If these values are nonzero (or outside of specified ranges around zero), the method 1500 continues to step 1510.

Next ri (the rear differential turn radius) and ro (the front differential turn radius) are calculated as follows (see FIG. 16 for illustrations of ri and ro):

$$ri = (\cot|\emptyset|*l) + \tfrac{1}{2}d \quad \text{Equation 4.1}$$

$$ro = \sqrt{ri^2 + l^2} \quad \text{Equation 4.2}$$

At step 1510, the difference in travel distance between the front axle and the rear axle is expressed as a ratio, Rd herein. Rd is calculated as follows:

$$Rd = \frac{ro}{ri} \quad \text{Equation 4.3}$$

At step 1512, the RPM of the (slower) rear output is calculated per the below equation. It is assumed the differential control input is mounted on the front (forward) side of the center differential (see FIG. 16).

$$RPMr = \frac{RPM}{\tfrac{1}{2}Rd + 0.5} \quad \text{Equation 4.4}$$

At step 1514, the RPMDiff is calculated as follows:

$$RPMDiff = RPM - RPMr \quad \text{Equation 4.5}$$

RPMr can now be used as the RPM value for the rear differential calculation described above. The faster angular velocity (RPMf) of the front output shaft can be calculated as follows:

$$RPMf = RPMr * Rd \quad \text{Equation 4.6}$$

RPMf can now be used as the RPM value for the front differential calculation described above. At step 1516, the control unit sends a signal to the variable speed motor to add RPMDiff to the rotational velocity of front output.

The calculations above require accurate floating-point numbers, especially for small values of Ø. In some embodiments, floating point arithmetic within the control unit should be performed with a suitable convention such as IEEE 754.

The power required by the variable speed motor (e.g., the servo or stepper motor) to drive the differential control shaft need not be large, unless differential steering method is used as the primary steering method. The variable speed motor is merely moving the differential at relatively low speeds and following the vehicle's desired differential rate. When external conditions do not favor the desired differential rate such as if one wheel is off the ground, the a mechanism such as a worm gear prevents power from being lost to that slipping wheel due to the one way nature of the worm gear. In this situation where the differential is forcing the desired differential rate even though external conditions are resisting it, the gear that connects the motor to the gearing assembly (e.g., worm gear or spur gear 56)) may experience a high torque load. In this situation it could be difficult for the variable speed motor to continue operating against a gear that is undergoing high torque load and tightly meshed. In this situation, it may be advantageous to stop the motor until the tension is released to prevent burnout of the motor.

With the degree of differential control that the systems and gearing assemblies disclosed herein provide, the desired differential rate can be adjusted to be different than the natural rate. For example, the control unit could be programmed to compensate for vehicle over-steer or under-steer by decreasing or increasing the differential rates respectively. In such embodiments, a sufficiently powerful variable speed motor should be employ to withstand the possible added stress.

The steering differential may need to be calibrated to adjust for changes in tire size due to uneven tread wear or differences in tire inflation pressures. A manual calibration knob may be used, which may increase or decrease the differential rates by small amounts or percentages. For example, a vehicle in motion with different sized tires on the left and right may tend to yaw to one side even when the steering wheels are kept straight. The knob may be used to adjust the differential rate in order to keep the vehicle traveling straight. More specifically the adjustment may cause the differential to increase the rotational velocity of the tire with the smaller radius and therefore slowing down the larger tire on the opposite side. This adjustment is done until the distance covered by the smaller tire that is spinning faster matches the distance covered by the larger tire that is turning slower in any unit time. In some embodiments, such an adjustment may be made automatically based on sensor input.

Figure 17:
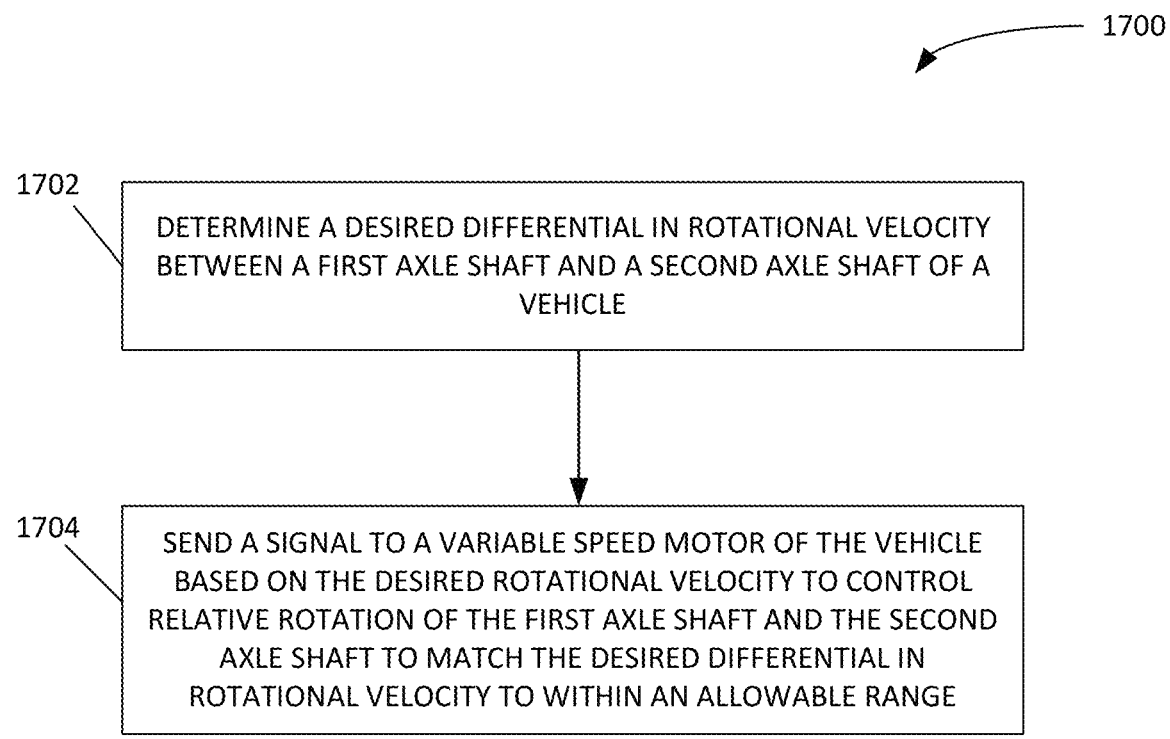
FIG. 17 is a flowchart of a method for operating a differential system in accordance with some embodiments.

FIG. 17 is a flowchart for an example method 1700 for operating a differential system according to an example embodiment. The method 1700 begins at step 1702 where a control unit including one or more processors is programmed to determine a desired differential in rotational velocity between a first axle shaft and a second axle shaft of a vehicle. In some embodiment, the control unit is a main computer of the vehicle. In some embodiments, the control unit is not included in the main computer of the vehicle. In some embodiments, the control unit is a computer that operates the engine of the vehicle. In some embodiments, the control unit is separate from the computer that operates the engine of the vehicle. In some embodiments, the control unit includes one or more microprocessors. The control unit can have any suitable configuration for implementing computer-executable instructions. The desired differential in rotational velocity is determined based, at least in part, on a current steering angle of the vehicle and on a current rotational velocity of a first drive shaft of the vehicle. The first drive shaft powers a differential to which the first axle shaft and the second axle shaft are connected.

At step 1704, the control unit is programmed to send a signal to a variable speed motor of the vehicle based on the desired differential in rotational velocity determined in step 1702 to control relative rotation of the first axle shaft and the second axle shaft to match the desired differential in rotational velocity to within an allowable range.

In an example embodiment, the allowable range may fall within a range of ±0% to ±15% of the desired differential value. In another example embodiment, the allowable range may fall within a range of ±1% to ±5% of the desired differential value.

In some embodiments, the control unit may be programmed to change the allowable range based, at least in part, on a sensor input while the vehicle is in motion. The sensor input may be an input from a g-force sensor or a sensor associated with the suspension of the vehicle. The allowable range may be changed based on input from a sensor or sensors over a period of time. The period of time may fall in a range of 5 seconds to 20 minutes. In other embodiments, the period of time may fall in a range of 1 minute to 10 minutes.

In other embodiments, the control unit may be programmed to change the allowable range in response to a user input. For example, the user input may indicate selection of a 'off road' or 'rough road' drive option for the vehicle. In another example, the control unit may adjust the allowable range automatically based on sensor readings indicating that the vehicle is moving over rough terrain. For example, the control unit may receive sensor input from an acceleration sensor or a sensor associated with the suspension over a period of time while the vehicle is in motion and adjust the allowable range in response to the received sensor input. A suitable period of time may be selected. For example, in some embodiments, the period of time may fall in a range of 5 seconds to 20 minutes. In some embodiments, the period of time may fall in a range of 1 minute to 10 minutes.

In an example embodiment, the variable speed motor controls relative rotation of the first axle shaft and the second axle shaft using a gearing assembly of the vehicle that is coupled to the variable speed motor. The gearing assembly may be any of the gearing assemblies described herein.

The control unit may receive information regarding a sensed current turning angle of the vehicle and receive information regarding a sensed current rotational velocity of the first drive shaft of the vehicle to determine the desired differential in rotational velocity at step 1702.

In an example embodiment, the variable speed motor may control relative rotation of the first axle shaft and the second axle shaft by rotating a control shaft at a rotational velocity that is proportional to the desired differential in rotational velocity determined in step 1702. This method may be implemented as a continuous closed-loop process.

In some embodiments, the desired differential in rotational velocity between the first axle shaft and the second axle shaft of the vehicle is also determined based on information regarding a width of the vehicle and a wheelbase of the vehicle.

In some embodiments, determining the desired differential in rotational velocity between the first axle shaft and the second axle shaft of the vehicle includes adding a factor related to a differential baseline during straight line travel based on a vehicle asymmetry. In some embodiments, this factor may be determined automatically by the control unit. The factor may be determined based on a sensed resistance to the desired differential rate during a period of time when the vehicle is in motion. In some embodiments, the period of time may fall in a range of 5 seconds to 20 minutes. In some embodiments, the period of time may fall in a range of 1 minute to 10 minutes.

In some embodiments, the method 1700 may further includes determining a second desired differential in rotational velocity between a third axle shaft and a fourth axle shaft of the vehicle. The second desired differential may be determined based on, at least in part, the current steering angle of the vehicle and on the current rotational velocity of a second drive shaft of the vehicle. The second drive shaft may power a second differential to which the third axle shaft and the fourth axle shaft are connected. The method 1700 may further include sending a signal to a second variable speed motor of the vehicle based on the desired second differential in rotational velocity to control relative rotation of the third axle shaft and the fourth axle shaft to match the desired second differential in rotational velocity to within a second allowable range. The second allowable range may be the same as or different than the allowable range in step 1704.

In an example embodiment, the first and second axle shafts may be shafts of a rear axle of the vehicle, and the third and fourth axle shafts may be shafts of a front axle of the vehicle. In some embodiments, the method 1700 may further include determining a third desired differential in rotational velocity between the first drive shaft and the second drive shaft of the vehicle based, at least in part, on the current turning angle of the vehicle and on the current rotational velocity output by the transmission or drive motor of the vehicle. The method 1700 may also include sending a signal to a third variable speed motor of the vehicle based on the desired third differential in rotational velocity to control relative rotation of the first drive shaft and the second drive shaft to match the desired third differential in rotational velocity to within a third allowable range.

Figure 18:
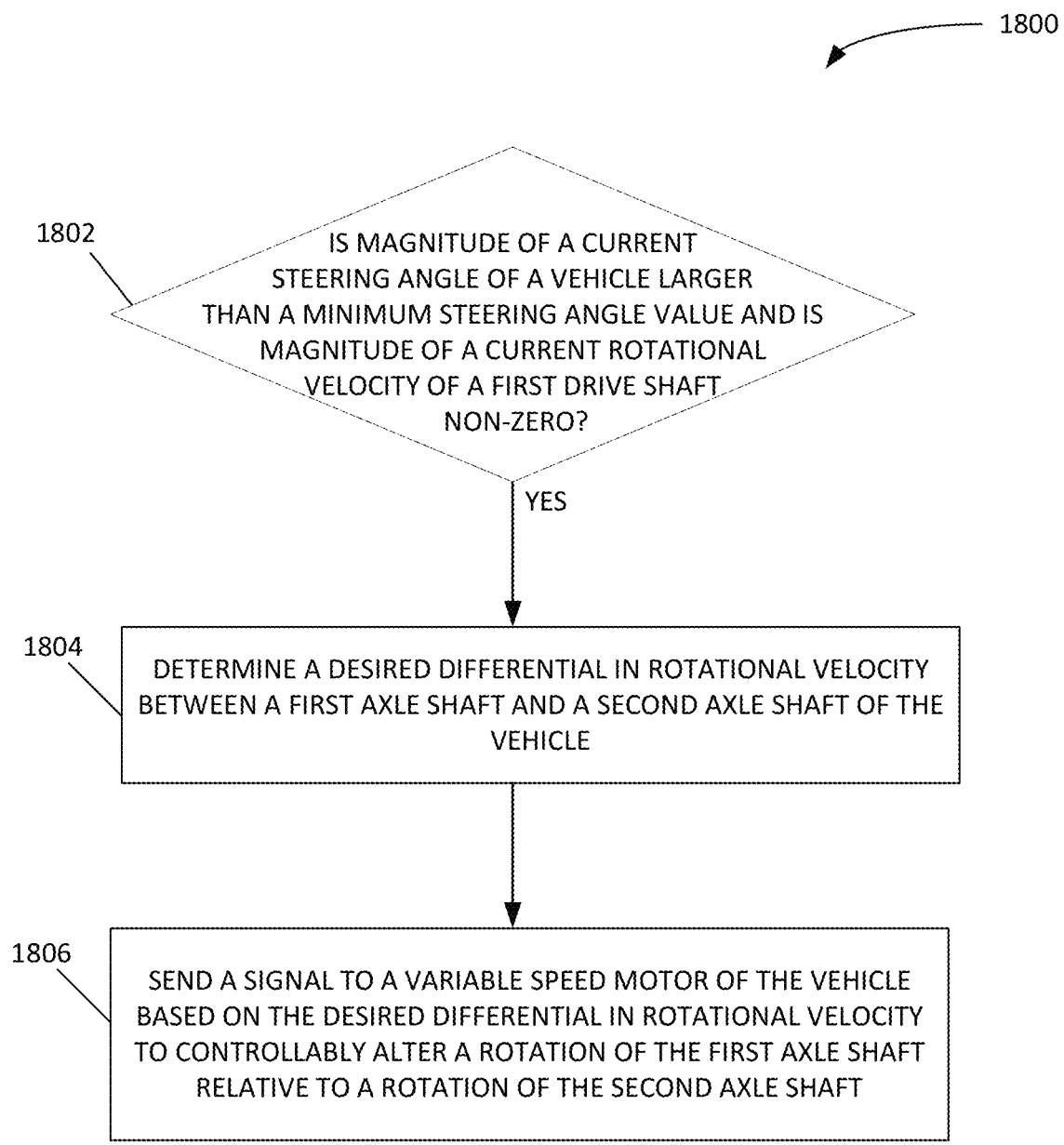
FIG. 18 is a flowchart of another method for operating a differential system in accordance with some embodiments.

FIG. 18 is a flowchart for a method 1800 for operating a differential system according to an example embodiment. The method 180 begins at step 1802 where a control unit of a vehicle is programmed to determine whether a magnitude of a current steering angle of a vehicle is larger than a minimum steering angle value, and to determine if a magnitude of a current rotational velocity of a first drive shaft of the vehicle is non-zero. In some embodiments, the non-zero drive shaft rotational velocity condition is met when the rotational velocity is less than about 0.002 rpm.

If these conditions are met, then at step 1804, the microprocessor is programmed to determine a desired differential in rotational velocity between a first axle shaft and a second axle shaft of the vehicle. The desired differential in rotational velocity is determined, at least in part, based on the current steering angle of the vehicle and the current rotational velocity of the first drive shaft of the vehicle. The first drive shaft powers a differential to which the first axle shaft and the second axle shaft are connected.

At step 1806, the microprocessor of the vehicle is programmed to send a signal to a variable speed motor of the vehicle based on the desired differential in rotational velocity determined in step 1804 to controllably alter a rotation of the first axle shaft relative to a rotation of the second axle shaft. This method may be implemented as a continuous closed-loop process.

In an example embodiment, the variable speed motor controls relative rotation of the first axle shaft and the second axle shaft using a gearing assembly of the vehicle that is coupled to the variable speed motor. The gearing assembly may be any of the gearing assemblies described herein.

In an example embodiment, if the magnitude of the current turning angle is larger than the minimum turning angle value and the magnitude of the current rotational velocity of the drive shaft is nonzero, then the microprocessor of the vehicle is programmed to determine a second desired differential in rotational velocity between a third axle shaft and a fourth axle shaft. The second desired differential in rotational velocity may be based on, at least in part, the current steering angle of the vehicle and the current rotational velocity of a second drive shaft of the vehicle. The second drive shaft may power a second differential to which the third axle shaft and the fourth axle shaft are connected. In this embodiment, the method 1800 may further include sending a signal to a second variable speed motor of the vehicle based on the determined second desired differential in rotational velocity to controllably alter the rotation of the third axle shaft relative to the fourth axle shaft.

In an example embodiment, the first and second axle shafts may be shafts of a rear axle of the vehicle, and the third and fourth axle shafts may be shafts of a front axle of the vehicle. In this embodiment, the method 1800 may include determining a third desired differential in rotational velocity between the first drive shaft and the second drive shaft of the vehicle based on, at least in part, the current steering angle of the vehicle and the current rotational velocity output by the transmission or drive motor of the vehicle. The method 1800 may further include sending a signal to third variable speed motor of the vehicle based on the determined third desired differential in rotational velocity to controllably alter the rotation of the first drive shaft relative to a rotation of the second drive shaft.

The control unit may receive information regarding a sensed current turning angle of the vehicle and receive information regarding a sensed current rotational velocity of the drive shaft of the vehicle.

In some embodiments, the minimum steering angle value falls in a range of 0.01 degrees to 5 degrees. In some embodiments, the method 1800 includes changing the minimum steering angle based on a sensor input while the vehicle is in motion. In other embodiments, the method 1800 includes changing the minimum steering angle in response to a user input.

In some embodiments, a method of controlling a differential rotation rate in a vehicle need not employ information regarding a current steering angle and a current driveshaft speed and need not include calculating a desired differential rotation rate steering angle sensor and driveshaft speed sensor are not utilized In such an embodiment, a control unit prevents the difference in rotation rates between axle shafts from exceeding a specified limit. Such an embodiment may permit greater wheel slip in conditions of unequal traction as compared to some of the other example embodiments described, but will still prevent excessive wheel slip corresponding to differential rotation values beyond the specified limit.

Such an embodiment may employ a sensor or set of sensors to continuously measure the rotational speed of an axle shaft (e.g., first axle shaft 18, third axle shaft) in relation to the rotational speed of the other axle shaft for that axle (e.g., second axle shaft 20, fourth axle shaft). Such embodiments may also employ a sensor to measure rotational torque acting on the variable speed motor. Such an embodiment will permit the variable motor to rotate in accordance with any rotational force acting to create a difference between the rotational speed of first axle shaft 18 and second axle shaft 20 within a programmed maximum allowable range. Such a maximum range will be determined based in part on the maximum difference in rotational speed between first and second axle shafts that could be plausibly achieved in non-slipping conditions for a vehicle equipped with such an embodiment. Should measured differential speeds exceed this maximum allowable range, the variable motor would be activated in opposition to the measured actual differential force.

In embodiments that employ a steering angle sensor and driveshaft speed sensor to calculate and apply a desired differential rate, it may be desirable to provide an operational mode to handle a scenario where one or both of these sensors either fail completely or produce an implausible signal. Such a scenario would result in an inability to accurately calculate the desired differential rate and this may negatively affect the handling agility of the vehicle. Should such a sensor failure be detected, such embodiments that rely on these sensors in normal operation would enter a safety mode of operation that permits the variable speed motor to turn in accordance with any rotational force acting to create a difference between the rotational speed of first axle shaft 18 and second axle shaft 20, up to a maximum plausible limit. Such a safety mode would be similar in operation to the embodiment described above that does not rely date regarding a current steering angle and current driveshaft speed.

Notes Regarding Embodiments

Notes in this section refer to reference numbers employed in the FIGS. 1-4 and 6-9 above merely for illustrative purposes. One of ordinary skill in the art in view of the present disclosure will appreciate that the notes below apply to other gearing assemblies as well.

Some embodiments provide a gearing assembly 14 that is connected to an variable speed motor 24 (e.g., a servo or stepper motor), which is controlled by a computer or computing device of a vehicle (e.g., an engine computer 26). The gearing assembly 14 includes a differential 40, which connects with a first axle shaft 18 and a second axle shaft 20 of a vehicle, and a plurality of adjustment gears, which are configured to controllably alter the rotation rate of the first axle shaft 18 relative to the rotation rate of the second axle shaft 20 using the variable speed motor 24.

In some embodiments, the gearing assembly does not rely on friction when altering the rotation rate of the first axle shaft 18 relative to the second axle shaft 20. This is beneficial because gearing assemblies that rely on friction, e.g., limited slip differentials, allow for some slip of axles and wheels, which can detract from the safety of a vehicle. In contrast, embodiments of the gearing assembly disclosed herein that do not rely on friction to alter the rotation rate of the first axle shaft relative to the second axle shaft do not allow for any slip of axles and wheels. Further, limited slip differentials allow some loss of torque to a slipping wheel, which does not occur with embodiments claimed herein that do not rely on friction when altering the rotation rate of the first axle shaft relative to the second axle shaft.

Embodiments that strictly enforce the determined desired differential in rotational speed between axle shafts allow no slip; however, even embodiments that allow for the actual differential in rotational speed between axles to deviate from the desired differential within specified upper and lower bounds, which allow a small amount of slip, allow only a small amount of slip when compared to conventional friction-based designed for differential and for limited-slip differentials.

Another benefit of some embodiments that do not rely on friction is that there are no friction components to wear out, which may reduce long term costs.

Another benefit of some embodiments that do not rely on friction or that allow only a slight deviation from the desired differential in rotational speed between the axle shafts is the reduction or elimination of torque-steer, which occurs due to unequal torque being supplied to drive wheels. Traditional limited slip differentials can actually exaggerate torque steer due to shifting torque between the left and right wheels and allowing large torque differences between the left and right wheels. By governing allowable rotation rates, methods and gear assemblies described herein can prevent torque imbalances from causing differences between left and right wheel rotational speeds under acceleration. In some embodiments, under high acceleration where torque steer is most noticeable, the allowable deviation from the desired differential in rotational speeds may be reduced to ensure that the left and right wheels rotate together to further prevent torque steer.

Another benefit of some embodiments that do not rely on friction or that allow only a slight deviation from the desired differential in rotational speed between the axles is a reduction or elimination of lag time in addressing or mitigating wheel slip. Many friction-based designs utilize wheel speed sensors to detect wheel slip and apply friction components to reduce slip. In certain situations such as climbing a hill under low traction, the delay required to detect and mitigate slip can cause an undesirable loss in vehicle momentum up the hill. By constantly calculating and applying the desired differential rotation rate for each axle at all times, this system does not suffer from this undesirable delay.

In some embodiments, the plurality of adjustment gears includes subassembly of planetary gears 60 including planetary gear carrier (e.g., endplate 72, endplate 70 and pins 67, 68, 69), a first set of planetary gears 61, 62, 63 coupled to the planetary gear carrier, and a second set of planetary gears 64, 65, 66 coupled to the planetary gear carrier. The second set of planetary gears 64, 65, 66, which are on the same carrier as the first set of planetary gears 61, 62, 63, couple the first set of planetary gears 61, 62, 63 with the first axle shaft 18. For example, in some embodiments, the second set of planetary gears 64, 65, 66, turn a spur gear 45 attached to the first axle shaft 18. The orbital speed of the first set of planetary gears 61, 62, 63 is proportional to the rotational speed of the first axis 18. The orbital speed of the first set of planetary gears 61, 62, 63 can be selectively adjusted using the variable speed motor 24, thereby selectively adjusting the rotational speed of the first axle shaft 18. For example, in some embodiments, the variable speed motor 24 turns a worm gear 56 that engages exterior gear teeth 54 of an annular gear 50, whose interior gear teeth 52 engage the first set of planetary gears 61, 62, 63. In some embodiments, the plurality of adjustment gears include the annular gear 50. One of the benefits of connecting the motor 24 to the annular gear 50 is that the annular gear 50 is disposed outward of the subassembly of planetary gears 60 making it easy to connect the annular gear 50 to shaft rotated by the motor 24.

In some embodiments, the rate of rotation of the motor 24 is proportional to the desired difference in rotational velocity between the first axle shaft 18 and the second axle shaft 20. In embodiments employing an annular gear 50 to transfer rotational motion from the motor to the first set of planetary gears 61, 62, 63, the rate of rotation of the annular gear 50 is also proportional to the desired difference in rotational speed between the first axle shaft 18 and the second axle shaft 20. Thus, when there is no desired difference in the rotational speed between the first axle shaft 18 and the second axle shaft 20, there is no rotation of the annular gear 50. During straight line travel when there is no desired difference in the rotational speed between the first axle shaft 18 and the second axle shaft 20, the annular gear 50, the first set of planetary gears 61, 62, 63 and the second set of planetary gears 64, 65, 66, all turn at a fraction of the rotational speed of the second axle shaft 20. Because an annular gear 50 would have a relatively high inertia, it is particularly beneficial that annular gear 50 only rotates when a difference in rotational speed between the axles is required, and when a difference in rotational speed is required, the rotational speed of the annular gear 50 is much smaller than that of either axle. If instead the annular gear were required to rotate faster than the second axle shaft, the system would experience significant drag from the annular gear.

In some embodiments, the plurality of adjustment gears interact with the differential 40 through a sun gear 42 that engages and drives the first set of planetary gears 61, 62, 63. Embodiments employing a sun gear 42 to engage and drive the first set of planetary gears 61, 62, 63 may have relatively little parasitic drag because the sun gear 42 is relatively small and the easiest gear to turn of all of the gears in the planetary gear subassembly.

In some embodiments, the plurality of adjustment gears includes the annular gear 60, the first set of planetary gears 61, 62, 63, the second set of planetary gears 64, 65, 66, the planetary gear carrier (e.g., endplate 72, endplate 70 and pins 67, 68, 69 or planetary gear carrier 71), the sun gear 42, which is coupled to the differential 40, and the spur gear 45.

As described above, the subassembly of planetary gears, which includes a first set of planetary gears and a second set of planetary gears on a common carrier, and the annular gear in which the subassembly of planetary gears is disposed enable control of a difference in rotational speed between the first axle shaft and the second axle shaft using a variable speed motor with relatively little added drag and with relatively little resistance to changes in rotational velocity.

Variations from Calculated Desired Differential Rotational Speed

The discussion above addresses some embodiments of methods that include determining a desired rotational speed for each axle joined by a differential, or for determining a desired difference in rotational speeds between the axles joined by a differential for a given set of conditions. However, some methods described herein for operating a vehicle include a tolerance or a deviation from the determined desired rate or rates, which reflect the real world conditions in which a vehicle operates. Further, one of ordinary skill in the art, in view of the present disclosure, would appreciate that a vehicle operating with insignificant deviations from the determined desired rotational speed for each axle or from the determined desired difference in rotational speeds between the axles would still fall within the scope of the invention.

Some methods described above disclose how to calculate and apply the desired differential rate for a given scenario; however, it is understood that this calculated rate would only be matched under ideal road conditions (dry and flat) with a vehicle with properly inflated tires. The calculated rate being matched means that the calculated rate for the given input signals agrees with the differential rate that the vehicle is actually experiencing at that moment. This is also the situation of minimal resistance on the variable speed motor. In reality, vehicles may be operated with asymmetrically inflated tires, and on road surfaces that create differential suspension action. As a result, it is necessary to allow a tolerance for deviation from the desired differential rate in order to accommodate such real-world variances. There are several factors to consider, which are described below.

Plausible Upper and Lower Bounds:

In some embodiments, it is important that the motor connected to the differential be allowed to rotate at a rate that yields a differential rate of rotation between the axles that differs from the determined desired differential rate in order to accommodate unforeseen conditions such as the ones described below. However, the absolute rate of deviation from the determined desired differential rate should be bounded to a minimum and maximum value below and above the determined desired rate, respectively. This establishes a plausible upper and lower bound beyond which it would be reasonable to expect the vehicle would not experience such differential rates under normal control. The range of plausibility should be determined by each manufacturer for each vehicle based on a number of factors such as vehicle type its intended performance goals, and vehicle dimensions. Generally speaking, a broader plausible range with respect to determined desired differential rate is more forgiving, whereas a tighter range will more aggressively seek to achieve the desired differential rate and may lead to increased tire wear.

Constant Deviation Due to Vehicle Asymmetries:

To accommodate deviations from the determined desired differential rate due to asymmetries in the vehicle, a pressure sensor or some other method or device can be employed to measure the resistance being experienced by the variable speed motor and its link to the planetary gear assembly. This sensor would be able to detect a constant deviation from the desired differential rate that would result from a vehicle asymmetry such as tires on one side of the vehicle being under inflated. For example, in straight line travel, the under inflated tires would need to spin faster to make up the same distance as the other tires thus creating a constant deviating force from the calculated desired rate (which should be zero in straight line travel, but now must be non-zero to accommodate the asymmetry). In this situation, the algorithm would self-adjust to factor in the new "constant" asymmetry, and perhaps inform the driver via an information display, or triggering an OBD code should this condition continue for some pre-determined duration. Such scenarios (constant deviation due to vehicle asymmetry) where the differential must self-adjust to the new "normal", can be thought of as analogous to utilizing the tare function on a kitchen scale. As explained above, in some embodiments, the control unit may be programmed to make automatic adjustments to the desired differential rate based on the sensed resistance to imposing the desired differential rate over a period of time.

Instantaneous Deviation Due to Asymmetrical Suspension Travel:

An additional source of deviation comes from asymmetrical suspension travel. However, this should be factored into the calculation of plausible upper and lower bounds. If a manufacturer desires a narrow range of plausible bounds above and below the determined desired rate, such that extreme suspension travel would regularly exceed the plausible bounds, then it may be necessary to factor suspension travel and allow a greater deviation under certain suspension conditions. In this case, sensors can be used to monitor the position of the vehicle's suspension and provide a greater allowable deviation. For example, if one side of the vehicle encounters undulating terrain causing heavy suspension travel, the wheels on that side are covering more "ground" and would need to be allowed to rotate slightly faster than the wheels on the other side. As explained above, in some embodiments, the range may be adjusted based on user input. As also explained above, in some embodiments, the range may be automatically adjusted during use based on sensor input over a period of time during motion (e.g., input from acceleration sensors or sensors associated with the suspension).

Although the present invention system can be embodied in many ways for use in or with different vehicles, some embodiments described below are described, for illustrative purposes, with respect to a vehicle having rear wheel drive. The description with respect to a rear wheel drive, is merely exemplary and should not be considered a limitation when interpreting the scope of the appended claims. One of ordinary skill in the art will appreciate that different aspects of systems, gearing assemblies and methods disclosed herein can be implemented in vehicles having rear wheel drive, front wheel drive and all-wheel drive.

As may be recognized by those of ordinary skill in the pertinent art based on the teachings herein, numerous changes and modifications may be made to the above-described and other embodiments of the present disclosure without departing from the spirit of the invention as defined in the appended claims. Accordingly, this detailed description of embodiments is to be taken in an illustrative, as opposed to a limiting, sense. Those skilled in the art will recognize, or be able to ascertain using no more than routine experimentation, many equivalents to the specific embodiments of the described herein. Such equivalents are intended to be encompassed by the following claims.

What is claimed is:

1. A method comprising:
   determining, using a microprocessor of the vehicle, a desired differential in rotational velocity between a first axle shaft and a second axle shaft of a vehicle based, at least in part, on a current steering angle of the vehicle, and on a current rotational velocity of a first drive shaft of the vehicle, wherein the first drive shaft powers a differential to which the first axle shaft and the second axle shaft are connected;

modifying the desired differential in rotational velocity based on a signal from a torque sensor that measures rotational torque on a variable speed motor of the vehicle; and sending a signal to the variable speed motor of the vehicle based, at least in part, on the modified desired differential in rotational velocity to control relative rotation of the first axle shaft and the second axle shaft to match the desired differential in rotational velocity to within an allowable range.

2. The method of claim 1, wherein determining the desired differential in rotational velocity includes receiving information regarding a sensed current turning angle of the vehicle and receiving information regarding a sensed current rotational velocity of the first drive shaft of the vehicle.

3. The method of claim 1, wherein the variable speed motor controls relative rotation of the first axle shaft and the second axle shaft by rotating a control shaft at a rotational velocity that is proportional to the modified desired differential in rotational velocity.

4. The method of claim 1, further comprising:
determining a second desired differential in rotational velocity between a third axle shaft and a fourth axle shaft of the vehicle based, at least in part, on the current steering angle of the vehicle and on the current rotational velocity of a second drive shaft of the vehicle, wherein the second drive shaft powers a second differential to which the third axle shaft and the fourth axle shaft are connected;

modifying the second desired differential in rotational velocity based on a signal from a second torque sensor that measures rotational torque on a second variable speed motor of the vehicle; and sending a signal to the second variable speed motor of the vehicle based on the desired second differential in rotational velocity to control relative rotation of the third axle shaft and the fourth axle shaft to match the modified desired second differential in rotational velocity to within a second allowable range, wherein the second allowable range is the same as or different than the allowable range.

5. The method of claim 4, wherein the first and second axle shafts are shafts of a rear axle of the vehicle, wherein the third and fourth axle shafts are shafts of a front axle of the vehicle, and wherein the method further comprises:
determining a third desired differential in rotational velocity between first drive shaft and the second drive shaft of the vehicle based, at least in part, on the current steering angle of the vehicle and on the current rotational velocity output by the transmission of the vehicle; and sending a signal to a third variable speed motor of the vehicle based on the determined third desired differential in rotational velocity to controllably alter the rotation of the first drive shaft relative to a rotation of the second drive shaft.

6. The method of claim 1, wherein modifying the desired differential in rotational velocity based on the signal from the torque sensor that measures rotational torque on a variable speed motor of the vehicle comprises:
storing information regarding a sensed resistance to imposition of the desired differential in rotational velocity by the variable speed motor of the vehicle to control relative rotation of the first axle shaft and the second axle shaft to match the desired differential in rotational velocity to within the allowable range measured over a period of time from the signal from the torque sensor while the vehicle is in motion; and modifying the desired differential in rotational velocity based on the stored information regarding the sensed resistance measured over the period of time.

7. The method of claim 6, wherein the stored information reflects a differential baseline during straight line travel based on a vehicle asymmetry.

8. The method of claim 6, wherein the method further comprises:
updating the stored information regarding the sensed resistance over a period of time from the signal from the torque sensor while the vehicle is in motion over a later period of time; and modifying the desired differential in rotational velocity based on the updated stored information.

9. The method of claim 1, further comprising changing the allowable range based, at least in part, on a measurement of the signal from the torque sensor.

10. The method of claim 9, wherein the allowable range is changed based on an instantaneous measurement or a current measurement of the signal from the torque sensor.

11. The method of claim 9, wherein the allowable range is changed based on a measurement of the signal from the torque sensor over a period of time.

12. The method of claim 11, wherein the period of time falls in a range of 5 seconds to 20 minutes.

13. The method of claim 1, wherein determining the desired differential in rotational velocity between the first axle shaft and the second axle shaft of the vehicle is also based on information regarding a width of the vehicle and a wheelbase of the vehicle.

14. The method of claim 1, further comprising receiving information regarding a sensed current steering angle of the vehicle, receiving information regarding a sensed current rotational velocity of the drive shaft of the vehicle, and receiving information regarding a current signal from the torque sensor.

15. The method of claim 1, further comprising:
determining if a magnitude of the current steering angle of the vehicle is larger than a minimum steering angle value and determining if a magnitude of the current rotational velocity of the first drive shaft of the vehicle is nonzero using a microprocessor of the vehicle;

wherein determining the desired differential in rotational velocity between the first axle shaft and the second axle shaft is in response to a determination that the magnitude of the current steering angle is larger than the minimum steering angle value and the magnitude of the current rotational velocity of the drive shaft is greater than the minimum drive rotational velocity value.

16. The method of claim 15, further comprising, if the magnitude of the current steering angle is larger than the minimum steering angle value and the magnitude of the current rotational velocity of the drive shaft is nonzero:
determining a second desired differential in rotational velocity between a third axle shaft and a fourth axle shaft of the vehicle based, at least in part, on the current steering angle of the vehicle and on the current rotational velocity of a second drive shaft of the vehicle, wherein the second drive shaft powers a second differential to which the third axle shaft and the fourth axle shaft are connected; and sending a signal to a second variable speed motor of the vehicle based on the determined second desired differential in rotational velocity to controllably alter the rotation of the third axle shaft relative to the fourth axle shaft.

17. The method of claim 15, further comprising changing the minimum steering angle based, at least in part, on a sensor input from the torque sensor while the vehicle is in motion.

18. The method of claim 15, further comprising changing the minimum steering angle based, at least in part, on stored information regarding a sensed resistance to imposition of the desired differential in rotational velocity by the variable speed motor of the vehicle to control relative rotation of the first axle shaft and the second axle shaft to match the desired differential in rotational velocity to within the allowable range measured over a period of time from the signal from the torque sensor while the vehicle is in motion.

19. A method comprising:
determining, using a microprocessor of the vehicle, a desired differential in rotational velocity between a first axle shaft and a second axle shaft of a vehicle based, at least in part, on a current steering angle of the vehicle, and on a current rotational velocity of a first drive shaft of the vehicle, wherein the first drive shaft powers a differential to which the first axle shaft and the second axle shaft are connected;
determining an allowable range based, at least in part, on a base allowable range and a measurement of a signal from one or more acceleration sensors or sensors associated with a suspension of the vehicle; and
sending a signal to the variable speed motor of the vehicle based, at least in part, on the desired differential in rotational velocity to control relative rotation of the first axle shaft and the second axle shaft to match the desired differential in rotational velocity to within the allowable range.

20. The method of claim 19, wherein the allowable range is determined based, at least in part, on an instantaneous measurement or a current measurement of the signal from the one or more acceleration sensors or sensors associated with the suspension of the vehicle.

21. The method of claim 19, wherein the allowable range is determined based, at least in part, on a measurement of the signal from the one or more acceleration sensors or sensors associated with the suspension of the vehicle over a period of time.

22. The method of claim 21, wherein the period of time falls in a range of 5 seconds to 20 minutes.

* * * * *